US011930200B2

(12) United States Patent
Li et al.

(10) Patent No.: US 11,930,200 B2
(45) Date of Patent: *Mar. 12, 2024

(54) METHOD AND APPARATUS FOR VIDEO CODING

(71) Applicant: Tencent America LLC, Palo Alto, CA (US)

(72) Inventors: Xiang Li, Saratoga, CA (US); Guichun Li, Milpitas, CA (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 193 days.

This patent is subject to a terminal disclaimer.

(21) Appl. No.: 17/699,663

(22) Filed: Mar. 21, 2022

(65) Prior Publication Data

US 2022/0210456 A1    Jun. 30, 2022

Related U.S. Application Data

(63) Continuation of application No. 16/809,189, filed on Mar. 4, 2020, now Pat. No. 11,323,731.

(Continued)

(51) Int. Cl.
*H04N 19/44* (2014.01)
*H04N 19/105* (2014.01)
(Continued)

(52) U.S. Cl.
CPC ........... *H04N 19/44* (2014.11); *H04N 19/105* (2014.11); *H04N 19/119* (2014.11); *H04N 19/132* (2014.11); *H04N 19/176* (2014.11)

(58) Field of Classification Search
CPC .... H04N 19/44; H04N 19/105; H04N 19/119; H04N 19/132; H04N 19/176; H04N 19/513; H04N 19/573; H04N 19/54
(Continued)

(56) References Cited

U.S. PATENT DOCUMENTS

2006/0120450 A1* 6/2006 Han .................. H04N 19/61
375/240.18
2020/0221122 A1* 7/2020 Ye .................... H04N 19/176

OTHER PUBLICATIONS

Extended European Search Report dated Oct. 8, 2021 in European application No. 20771112.8.
(Continued)

*Primary Examiner* — Tung T Vo
(74) *Attorney, Agent, or Firm* — ARENTFOX SCHIFF LLP

(57) ABSTRACT

An apparatus for video decoding, includes processing circuitry configured to determine an affine model for a current block coded with an interweaved affine mode. Based on the affine model, a first prediction block corresponding to a first pattern for partitioning the current block into first sub-blocks and a second prediction block corresponding to a second pattern for partitioning the current block into second sub-blocks can be generated. The first and second prediction blocks include interpolated samples having an intermediate bit-depth larger than an input bit-depth of the current block. Co-located first and samples in the first and second prediction blocks with a precision corresponding to the intermediate bit-depth are weighted averaged to obtain averaged samples. The averaged samples are rounded to the input bit-depth to obtain corresponding third samples in a final prediction block of the current block.

20 Claims, 23 Drawing Sheets

Related U.S. Application Data

(60) Provisional application No. 62/816,049, filed on Mar. 8, 2019.

(51) Int. Cl.
*H04N 19/119* (2014.01)
*H04N 19/132* (2014.01)
*H04N 19/176* (2014.01)

(58) Field of Classification Search
USPC .................................................. 375/240.25
See application file for complete search history.

(56) References Cited

OTHER PUBLICATIONS

Zhang, et al., "Non-CE2: Interweaved Prediction for Affine Motion Compensation". Joint Video Experts Team (JVET) of ITU-T SG 16 WP 3 and ISO/IEC JTC 1/SC 29/WG 11, 13th Meeting Marrakech, MA, Jan. 9-18, 2019, JVET-M0268-v3. XP030202207.

Zhang, et al., "Non-CE2: Interweaved Prediction for Affine Motion Compensation", JVET-M0268, 2019, XP030202210.

Hanhart, et al.. "Non-CE2: Motion vector clipping in affine sub-block motion vector derivation", Joint Video Experts Team (JVET) of ITU-T SG 16 WP 3 and ISO/IEC JTC 1/SC 29/WG 11, 13th Meeting; Marrakech, MA, Jan. 9-18, 2019, JVET-M0145-vl, XP030202554.

Hanhart, et al., "Non-CE2: Motion vector clipping in affine sub-block motion vector derivation", JTET-M0145, 2019, XP030202555.

Chen, et al.. "Algorithm description for Versatile Video Coding and Test Model 4 (VTM 4)", Joint Video Experts Team (JVET) of ITU-T SG 16 WP 3 and ISO/IEC JTC 1/SC 29/WG 11, 13th Meeting: Marrakech. MA. Jan. 9-18, 2019, JVET-M1002-v2, XP030255391.

Bross, et al., "Versatile Video Coding (Draft 3)", Joint Video Experts Team (JVET) of ITU-T SG 16 WP 3 and ISO/IEC JTC 1/SC 29/WG 11, 12th Meeting: Macao, CN, Oct. 3-12, 2018, JVET-L1001-v9.

Chen, et al.. "Algorithm description for Versatile Video Coding and Test Model 3 (VTM 3)", Joint Video Experts Team (JVET) of ITU-T SG 16 WP 3 and ISO/IEC JTC 1/SC 29/WG 11, 12th Meeting: Macao, CN, Oct. 3-12, 2018, JVET-L1002-v1.

Zhang, et al., "Non-CE2: Interweaved Prediction for Affine Motion Compensation", Joint Video Experts Team (JVET) of ITU-T SG 16 WP 3 and ISO/IEC JTC 1/SC 29/WG 11,13th Meeting: Marrakech, MA, Jan. 9-18, 2019, JVET-M0268-v3.

* cited by examiner

| Triangle partition index | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| Split direction | 0 | 1 | 1 | 0 | 0 | 1 | 1 | 1 | 0 | 0 | 0 | 0 | 1 | 0 | 0 | 0 | 0 | 1 | 1 | 1 |
| Merge index of first triangular prediction unit | 1 | 0 | 0 | 0 | 2 | 0 | 0 | 1 | 3 | 4 | 0 | 1 | 1 | 0 | 0 | 1 | 1 | 1 | 1 | 2 |
| Merge index of second triangular prediction unit | 0 | 1 | 2 | 1 | 0 | 3 | 4 | 0 | 0 | 0 | 2 | 2 | 2 | 4 | 3 | 3 | 4 | 4 | 3 | 1 |

| Triangle partition index | 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|---|
| Split direction | 1 | 0 | 0 | 1 | 1 | 1 | 1 | 1 | 1 | 1 | 0 | 0 | 1 | 0 | 1 | 0 | 0 | 1 | 0 | 0 |
| Merge index of first triangular prediction unit | 2 | 2 | 4 | 3 | 3 | 4 | 4 | 3 | 2 | 4 | 4 | 2 | 4 | 3 | 4 | 3 | 2 | 2 | 4 | 3 |
| Merge index of second triangular prediction unit | 0 | 1 | 3 | 0 | 2 | 4 | 0 | 1 | 3 | 1 | 1 | 3 | 2 | 2 | 3 | 1 | 4 | 4 | 2 | 4 |

FIG. 20

ID AND APPARATUS FOR VIDEO CODING

METHOD AND APPARATUS FOR VIDEO CODING

INCORPORATION BY REFERENCE

This application is a continuation of application Ser. No. 16/809,189, filed Mar. 4, 2020, which claims the benefit of priority to U.S. Provisional Application No. 62/816,049, "Improvement of Interweaved Affine Mode" filed on Mar. 8, 2019 The disclosures of the prior applications are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing are neither expressly nor impliedly admitted as prior art against the present disclosure.

Video coding and decoding can be performed using inter-picture prediction with motion Compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth, or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used fix the prediction of a newly reconstructed picture or picture part. In some cases, the reference picture can be the same as the picture currently under reconstruction. MVs, can have two dimensions X and Y, or three dimensions, the third being an indication of the reference picture in use (the latter, indirectly, can be a time dimension).

In some video compression, techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively), in H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry configured to determine an affine model for a current block coded with an interweaved affine mode. Based on the affine model, a first prediction block corresponding to a first pattern for partitioning the current block into first sub-blocks and a second prediction block corresponding to a second pattern for partitioning the current block into second sub-blocks can be generated. The first and second prediction blocks include interpolated samples having an intermediate bit-depth larger than an input bit-depth of the current block. A third prediction block can be generated based on the first and second prediction blocks. First samples in the first prediction block and corresponding second samples in the second prediction block each with a precision corresponding to the intermediate bit-depth are combined by performing a weighted average operation to obtain averaged samples. The averaged samples are rounded to the input bit-depth to obtain corresponding third samples in the third prediction block.

In an embodiment, the weighted average operation includes adding a rounding offset to a weighted sum of the first sample and the corresponding second sample. In an embodiment, the second pattern is shifted with respect to the first pattern and includes whole sub-blocks and fractional sub-blocks, and when the first and second samples are located within a region corresponding to the whole sub-blocks of the second blocks, then the second sample is given a zero weight in the weighted average operation. In an embodiment, when the first and second samples are located within a region corresponding to the second blocks having the first size, then the first and second samples are given an equal weight in the weighted average operation.

In an example, the third sample is constrained to be within a range from 0 to a maximum possible value corresponding to the input bit-depth. In an example, deblocking disabled for the current block. In an example, the second pattern is shifted with respect to the first pattern and includes whole sub-blocks and fractional sub-blocks, and deblocking is disabled within a region corresponding to the whole sub-blocks of the second blocks, and is applied or not applied to a region corresponding to the fractional sub-blocks of the second blocks.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIG. 20 shows a lookup table used to derive a split direction and partition motion information based on a triangle partition index in accordance with an embodiment.

DETAILED DESCRIPTION OF EMBODIMENTS

I. Video Coding Encoder and Decoder

Figure 1:
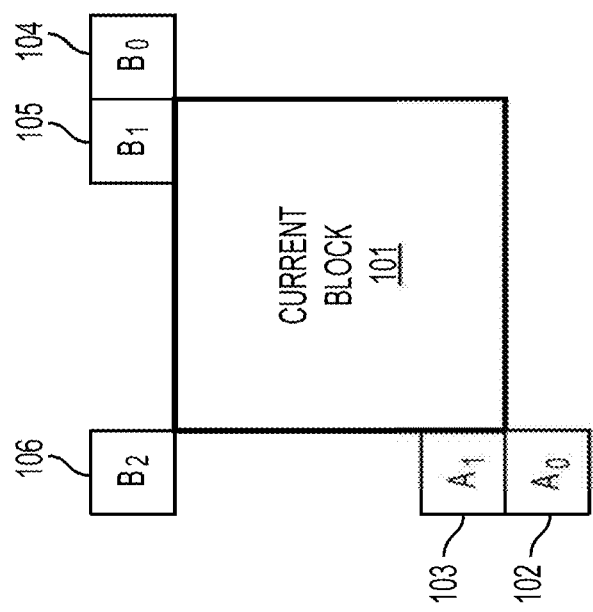
FIG. 1 is a schematic illustration of a current block and its surrounding spatial merge candidates in one example.
Figure 2:
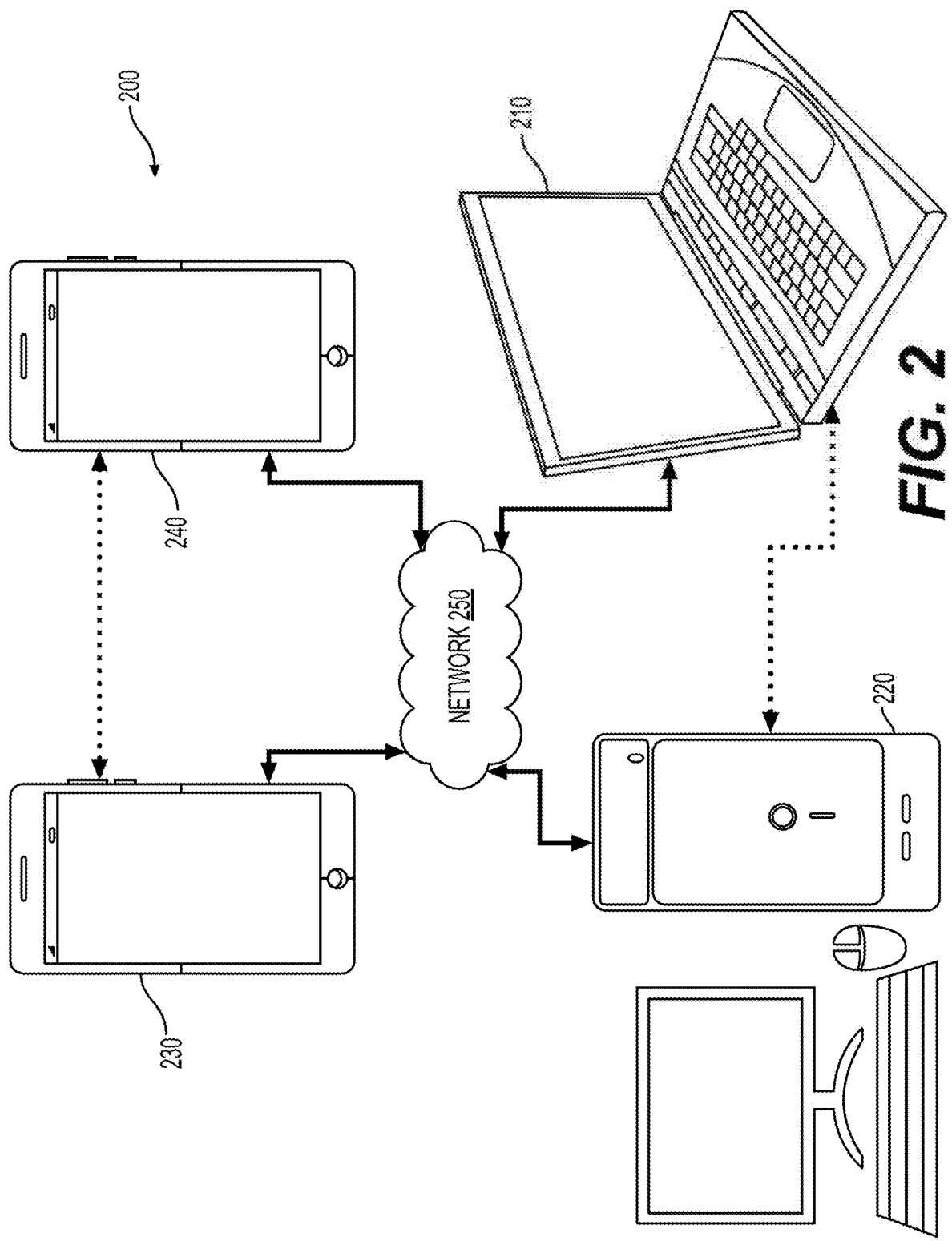
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks, and/or the Internet. For the purposes of the present discussion, the architecture and topology of the network (250) may be immaterial to the operation of the present disclosure unless explained herein below.

Figure 3:
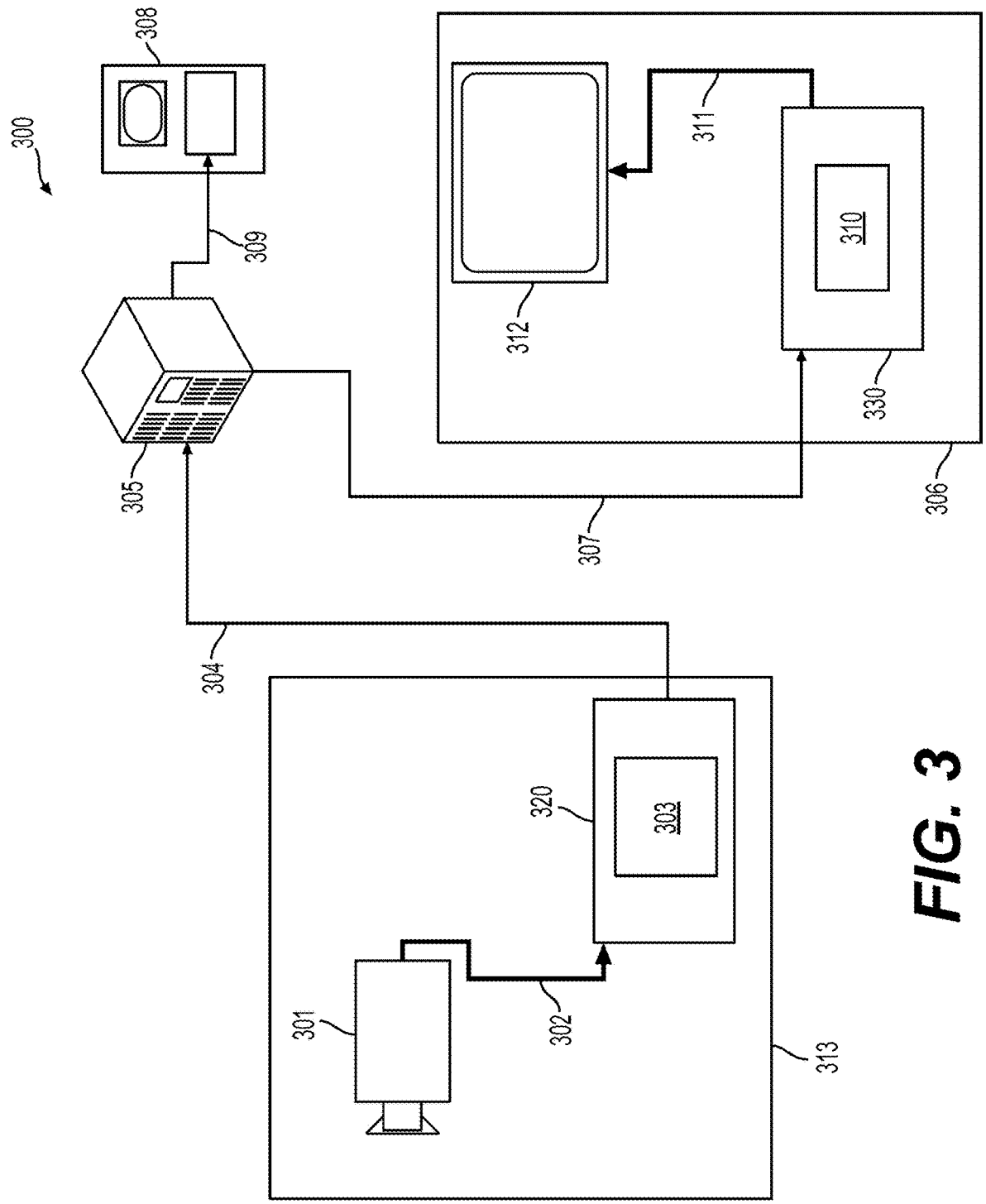
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams) can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other Components (not shown). For example, the electronic device (320) can include a video decoder (not shown) and the electronic device (330) can include a video encoder (not shown) as well.

Figure 4:
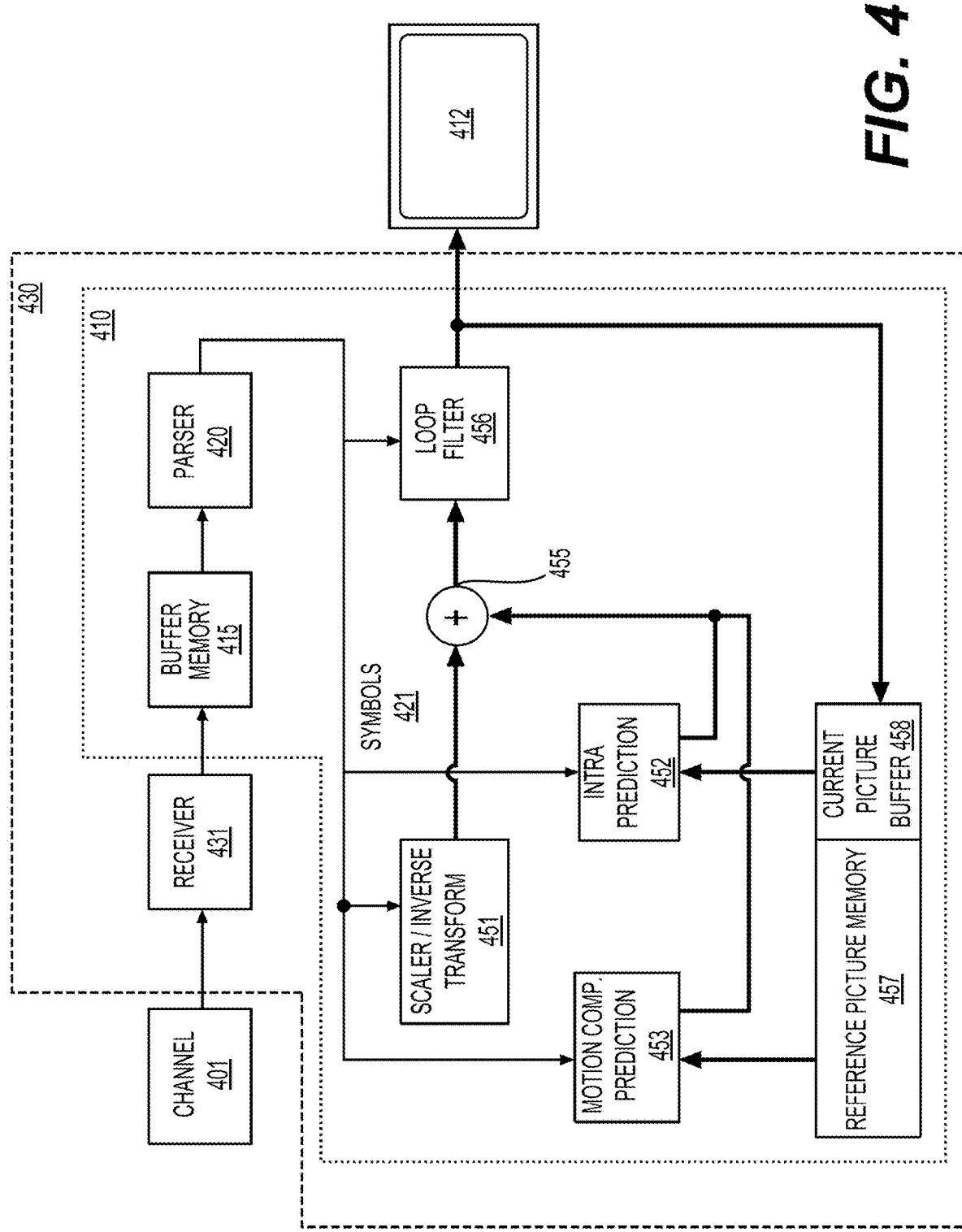
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition, another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks. Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type, of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (454) receives a quantized transform coefficient as well as, control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (45) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject: to various loop filtering techniques in the loop filter unit (456). Video compression technologies, can include in-loop filter technologies that are controlled by parameters included in the coded video sequence (also referred to as coded video bitstream) and made available to the loop filter unit (456) as symbols (421) from the parser (420), but can, also be responsive to meta-information obtained during the decoding of previous (in decoding, order) parts of the coded picture or coded video sequence, as, well as responsive to previously reconstructed and loop-filtered sample values.

The output of the loop rarer unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec, H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
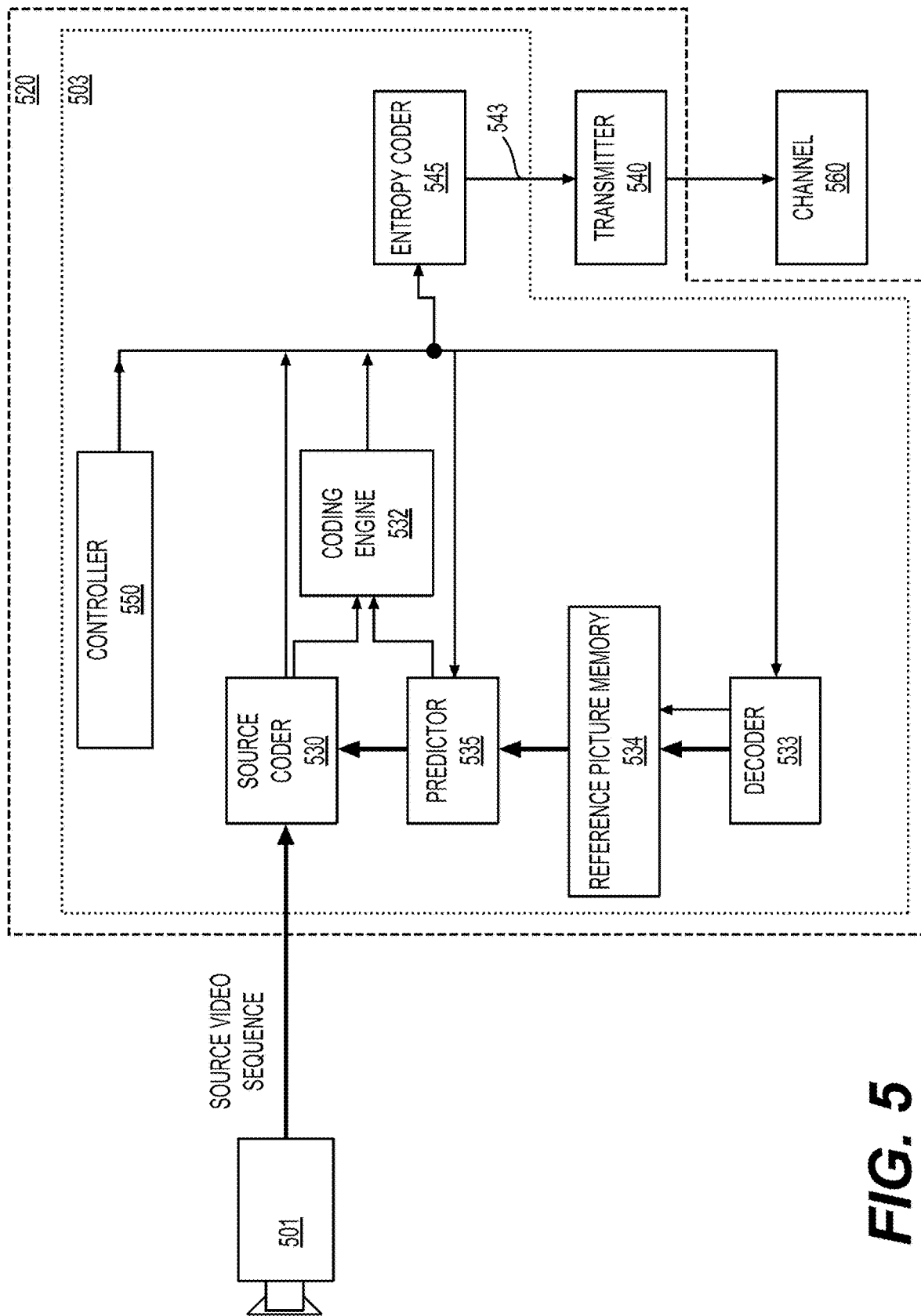
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic, device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bit- stream is lossless in the video compression technologies considered in the disclosed subject matter). The reconstructed sample stream (sample data) is input to the reference picture memory (534). As the decoding of a symbol stream leads to bit exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video, decoder (410), including the buffer memory (415), and parser (420) may not be fully implemented in the local decoder (533).

An observation that can be made at this point is that an decoder technology except the parsing/entropy decoding that is present in aa decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input, picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by losslessly compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture, in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When, a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
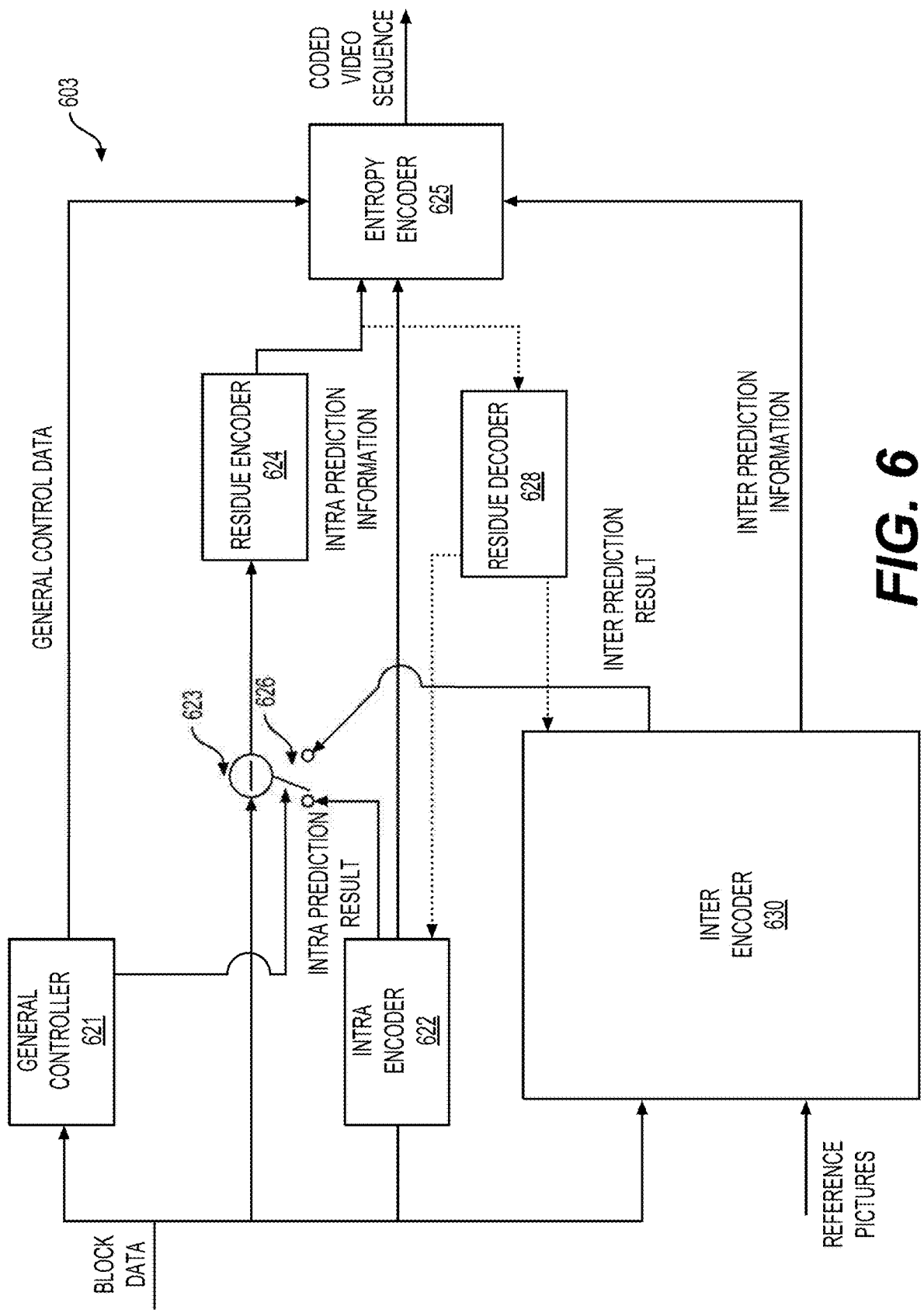
FIG. 6 shows a block diagram of an encoder in accordance with another embodiment.

FIG. 6 shows a diagram of a video encoder (603) according to another embodiment of the disclosure. The video encoder (603) is configured to receive a processing block. (e.g., a prediction block) of sample values within a current video picture in a sequence of video pictures, and encode the processing block into a coded picture that is part of a coded video sequence. In an example, the video encoder (603) is used. In the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
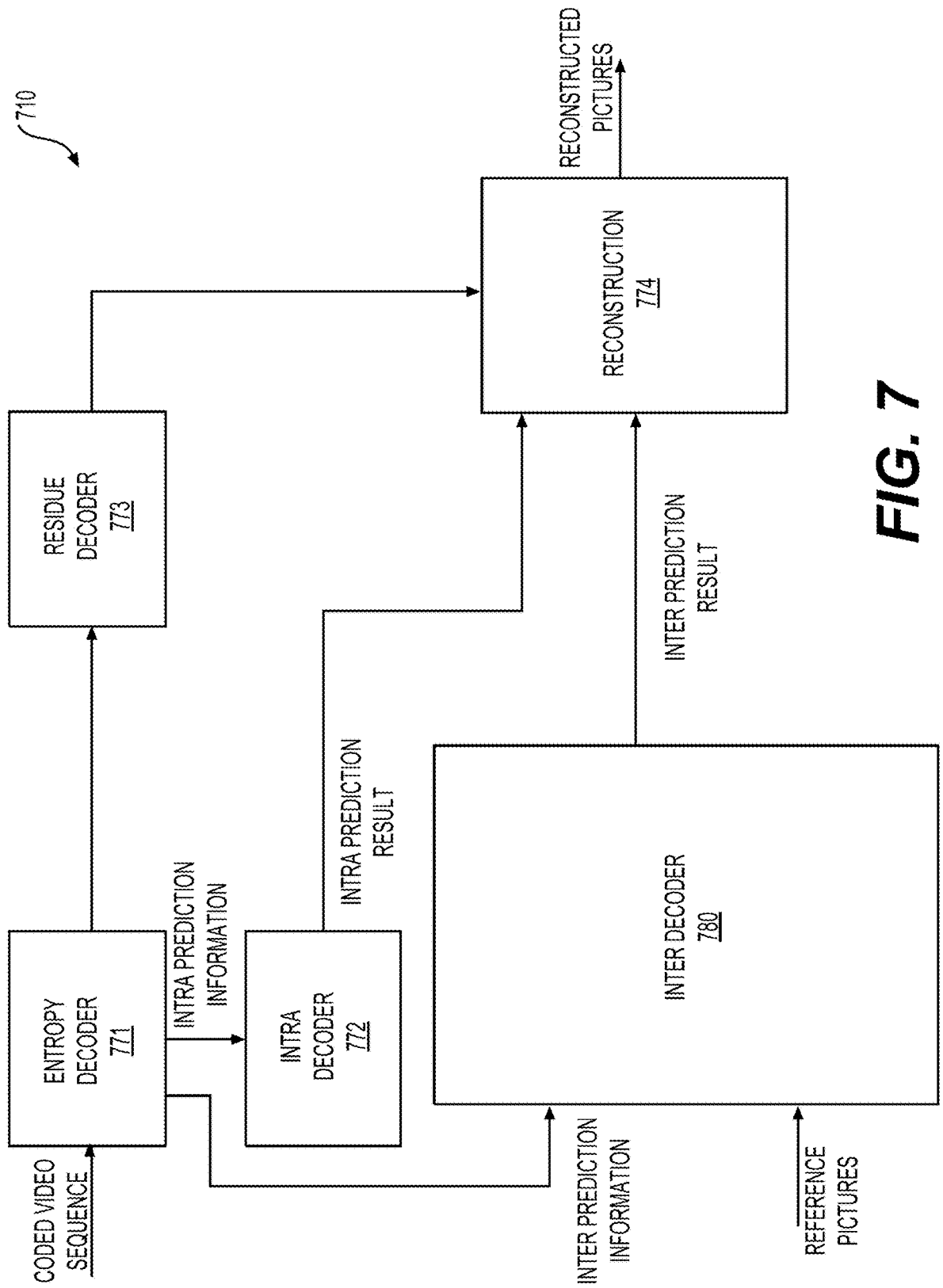
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to term a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410) and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

II. Inter Prediction Technologies

In various embodiments, for an inter-predicted CU, motion parameters including motion vectors, reference picture indices, reference picture list usage index, and possibly other additional information can be used for inter-predicted sample generation. The motion parameters can be signaled in an explicit or implicit manner. When a CU is coded with a skip mode, the CU is associated with one and has no significant residual coefficients, coded motion vector delta, or reference picture indices associated with the CU.

When a merge mode is employed, motion parameters for a current CU can be obtained from neighboring CUs, including spatial and temporal merge candidates, and optionally other merge candidates. The merge mode can be applied to an inter-predicted CU, and may be used for a skip mode. An alternative to the merge mode is an explicit transmission of motion parameters. For example, motion vectors, respective reference picture indices for each reference picture list, reference picture list usage flags, and other needed information can be signaled explicitly per each CU.

The following inter prediction coding tools are used in some embodiments:
Extended merge prediction
Merge mode with motion vector difference (MMVD)
Affine motion compensated prediction
Subblock-based temporal motion vector prediction (SbTMVP)
Triangle partition prediction
Combined inter and intra prediction (CIIP)

1. Extended Merge Prediction

In some embodiments, a merge candidate list is constructed by including the following five types of candidates in order:
1) Spatial motion vector predictor (SMVP) from spatial neighbor CUs,
2) Temporal motion vector predictor (HMVP) from col-located CUs,
3) History-based motion vector predictor (HMVP) from a first-in-first-out (FIFO) table,
4) Pairwise average motion vector predictor (MVP),
5) Zero MVs.

In some embodiments, the size of the merge list is signaled in a slice header and the maximum allowed size of the merge list is 6. For each CU coded in merge mode, an index of best merge candidate is encoded using truncated unary (TU) binarization. The first bin of the merge index is coded with context, and bypass coding is used for other bins.

Examples of generation processes of each category of merge candidates are described below.

1.1 Spatial Candidates Derivation

Figure 9:
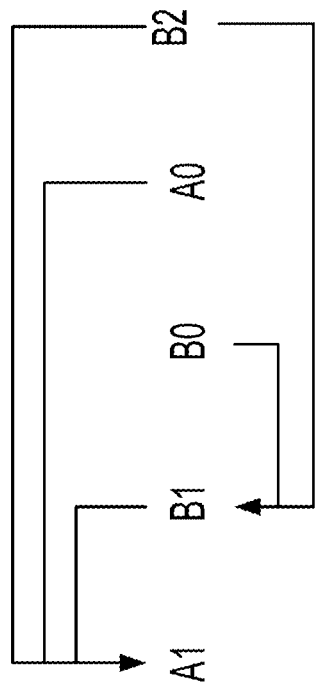
FIG. 9 shows candidate pairs on an extended merge list for a redundancy check process in accordance with an embodiment.
Figure 8:
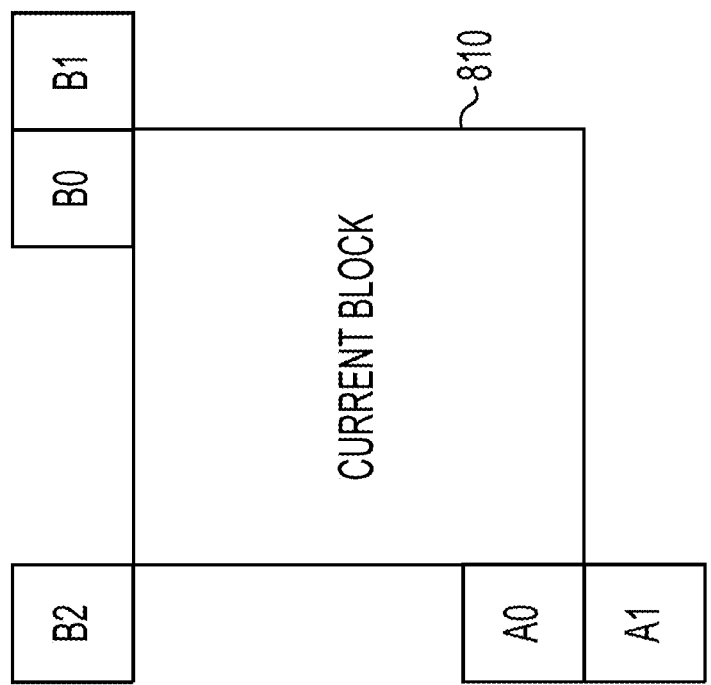
FIG. 8 shows candidate positions from which a set of spatial merge candidates can be selected to construct an extended merge candidate list in accordance with an embodiment.

In a process of deriving, spatial merge candidates, a maximum of four merge candidates are selected among candidates located in the positions A1, B1, B0, A0 and B2 neighboring a current block (810) in FIG. 8. The order of derivation is A1, B1, B0, A0 and B2. Position B2 is considered when any CU of position A1, B1, B0, A0 is not available (e.g. because it belongs to another slice or tile) or is intra coded. After the candidate at position A1 is added, the addition of the remaining candidates is subject to a redundancy cheek which ensures that candidates with same motion information are excluded from the list. As a result, coding efficiency is improved. To reduce computational complexity, not, all possible candidate pairs are considered in the mentioned redundancy check. Instead, the pairs linked with an arrow in FIG. 9 are considered. A candidate is added to the list when the corresponding candidate used for redundancy check has not the same motion information.

1.2 Temporal Candidates Derivation

Figure 10:
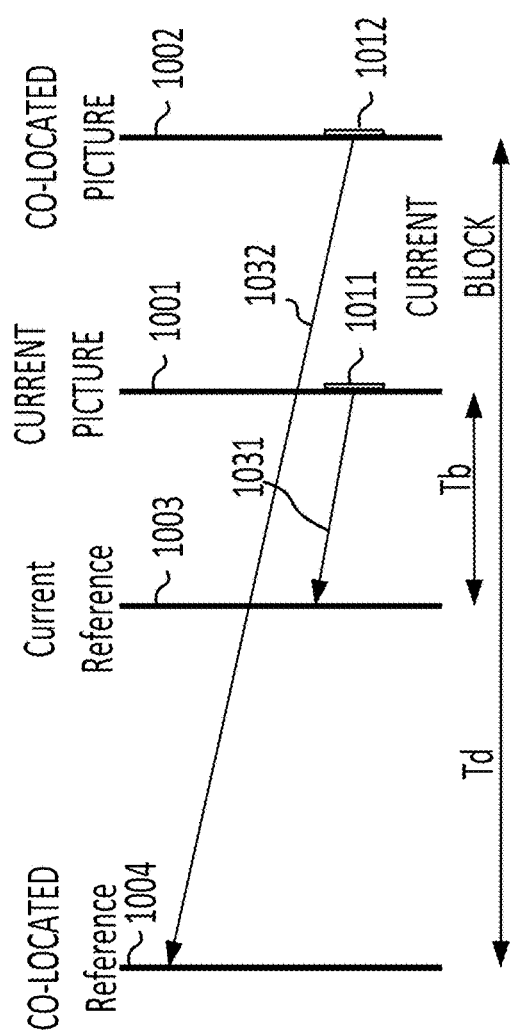
FIG. 10 shows an example of deriving a temporal merge candidate on an extended merge list in a current picture in accordance with an embodiment.

In an embodiment, one temporal candidate is added to the list. Particularly, in the derivation of this temporal merge candidate for a current block (1011) in a current picture (1001), a scaled motion vector (1031) is derived based on a co-located CU (1012) belonging to a collocated reference picture (1002) as shown in FIG. 10. The reference picture list to be used for derivation of the co-located CU is explicitly signaled in the slice header. The scaled motion vector (1031) for the temporal merge candidate is scaled from a motion vector (1032) of the co-located CU (1012) using picture order count (POC) distances, Tb and Td. Tb is defined to be a POC difference between a current reference picture (1003) of the current picture (1001) and the current picture (1001). Td is defined to be a POC difference between a co-located reference picture (1004) of the co-located picture (1002) and the co-located picture (1002). A reference picture index of the temporal merge candidate is set equal to zero.

Figure 11:
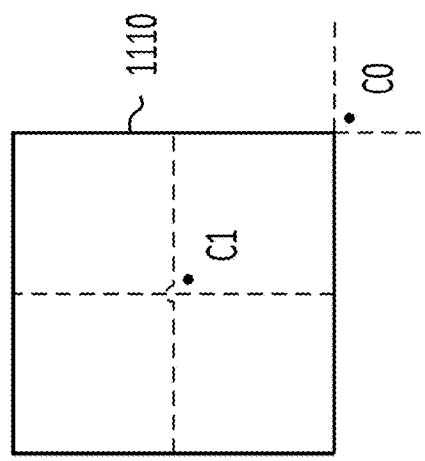
FIG. 11 shows candidate positions from which a temporal merge candidate on, an extended merge list can be selected in accordance with an embodiment.

The position for the temporal candidate is selected between candidates C0 and C1 shown in FIG. 11. If a CU at position C0 is not available, intra coded, or is outside of the current rows of CTUs, the position C1 is used. Otherwise, position C0 is used in the derivation of the temporal merge candidate.

1.3 History-Based Merge Candidates Derivation

In some embodiments, history-based MVP (HMVP) merge candidates are added to a merge list after the SMVP and TMVP, In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter coded CU, the associated motion information is added to the last entry of the table as a new HMVP candidate.

In an embodiment, the HMVP table size S is set to be 6, which indicates up to 6 History-based MVP (HMVP) candidates may be added to the table. When inserting a new motion candidate to the table, a constrained FIFO rule is utilized wherein redundancy check is firstly applied to find whether there is an identical HMVP in the table. If found, the identical HMVP is removed from the table, and all the HMVP candidates afterwards are moved forward.

HMVP candidates can be used in a merge candidate list construction process. The latest several HMVP candidates in the table are checked in order and inserted to the candidate list after the TMVP candidate, A redundancy check is applied on the HMVP candidates to the spatial or temporal merge candidate.

In an example, to reduce the number of redundancy check operations, the following simplifications are introduced:
(i) Number of HMPV candidates used for merge list generation is set as (N<=4)? M: (8−N), wherein N indicates number of existing candidates in the merge list and M indicates a number of available HMVP candidates in the table.
(ii) Once the total number of available merge candidates reaches the maximally allowed merge candidates minus 1, the merge candidate list construction process from HMVP is terminated.

1.4 Pair-Wise Average Merge Candidates Derivation

In some embodiments, pairwise average candidates are generated by averaging predefined pairs of candidates in the existing merge candidate list. For example, the predefined pairs are defined as {(0, 1), (0, 2), (1, 2), (0, 3), (1, 3), (2, 3)}, where the numbers denote the merge indices to the merge candidate list. The averaged motion, vectors are calculated separately for each reference list. If both motion vectors are available in one list these two motion vectors are averaged even when they point to different reference pictures; if only one motion vector is available, use the one directly; if no motion vector is available, keep this list invalid.

In an embodiment, when the merge list is not full after pair-wise average merge candidates are added the zero MVPs are inserted in the end until the maximum merge candidate number is encountered.

2. Merge Mode with Motion Vector Difference (MMVD)

In addition to merge mode, where implicitly derived motion information is directly used for prediction samples generation of a current CU, MMVD is used in some embodiments. A MMVD flag is signaled right after sending a skip flag and merge flag to specify whether a MMVD mode is used for a CU.

In an MMVD mode, after a merge candidate is selected, the merge candidate is further refined by signaled motion vector difference (MVD) information to obtain refined motion information. The MVD information includes a merge candidate flag, a distance index to specify a motion magnitude, and an index for indication of a motion direction.

Figure 12:
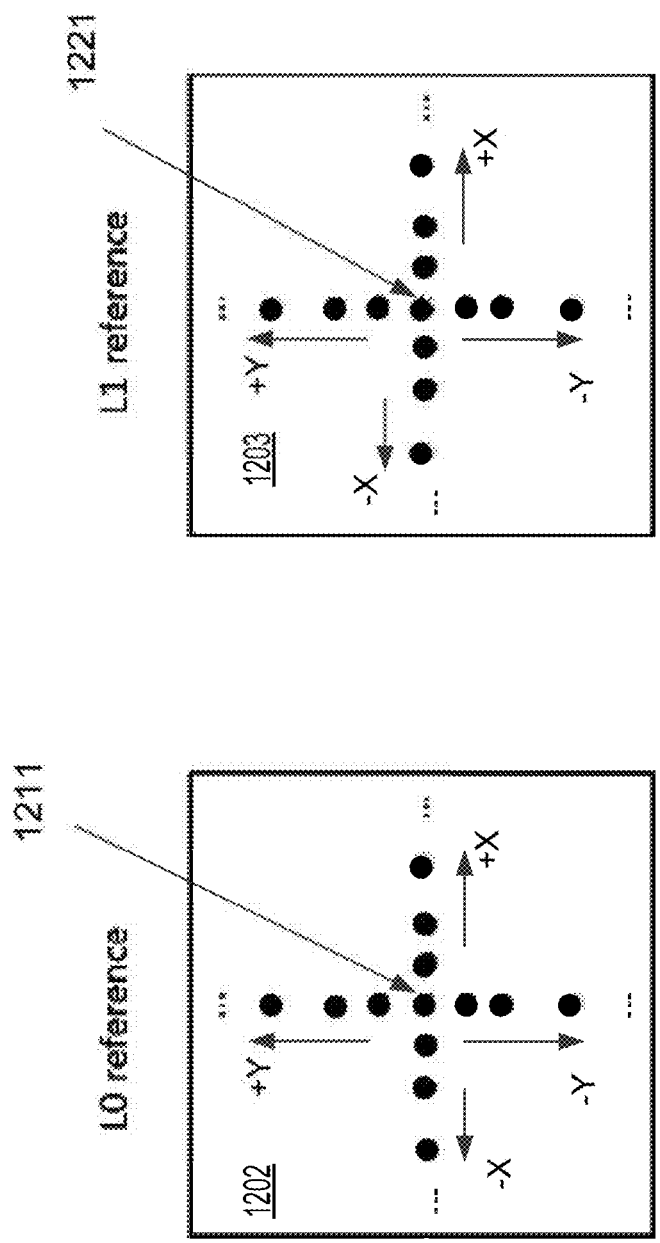
FIG. 12 shows prediction positions from which a prediction can be selected in a merge mode with motion vector difference (MMVD) in accordance with an embodiment.

One of the first two candidates in the merge list is selected to be used as a MV basis (a starting MV(s)). The merge candidate flag is signaled to specify which one is used. As shown in FIG. 12, the MV basis determines a starting point (1211) or (1221) at a reference picture (1202) or (1203) in a reference picture list, L0 or L1, respectively.

The distance index specifies motion magnitude information and indicates a pre-defined offset from the starting point (1211) or (1221). As shown in FIG. 12, an offset is added to either a horizontal component or vertical component of a starting MV (the MV basis) pointing at a position (1211) or (1221). The mapping relationship of a distance index and pre-defined offset is specified in Table 1.

TABLE 1

| Distance IDX | 0 | 1 | 2 | 3 | 4 | 5 | 6 | 7 |
|---|---|---|---|---|---|---|---|---|
| Offset (in unit of luma sample) | 1/4 | 1/2 | 1 | 2 | 4 | 8 | 16 | 32 |

The direction index represents a direction of a MVD relative to the starting point (1211) or (1221). The direction index can, represent one of the four directions as shown in Table 2.

TABLE 2

| Direction IDX | 00 | 01 | 10 | 11 |
|---|---|---|---|---|
| x-axis | + | − | N/A | N/A |
| y-axis | N/A | N/A | + | − |

It is noted that the meaning of an MVD sign can vary according to the information of starting MV(s). When the starting MV(s) is a tam-prediction MV or bi-prediction MVs both pointing to the same side of a current picture (i.e. POCs of two references are both larger than the POC of the current picture, or are both smaller than the POC of the current picture), the sign in Table 2 specifies the sign of MV offset added to the starting, MV. When the starting MVs are bi-prediction MVs with the two MVs pointing to different sides of the current picture (i.e. the POC of one reference is larger than the POC of the current picture, and the POC of the other reference is smaller than the POC of the current picture), the sign in Table 2 specifies the sign of MV offset added to the MV component of the starting MV and the sign for the L1 MV has an opposite value.

Based on the basis MV, the offset, and the MVD sign, the final MV(s) can be determined for the current CU.

3. Affine Motion Compensated Prediction

Figures 13A, 13B:
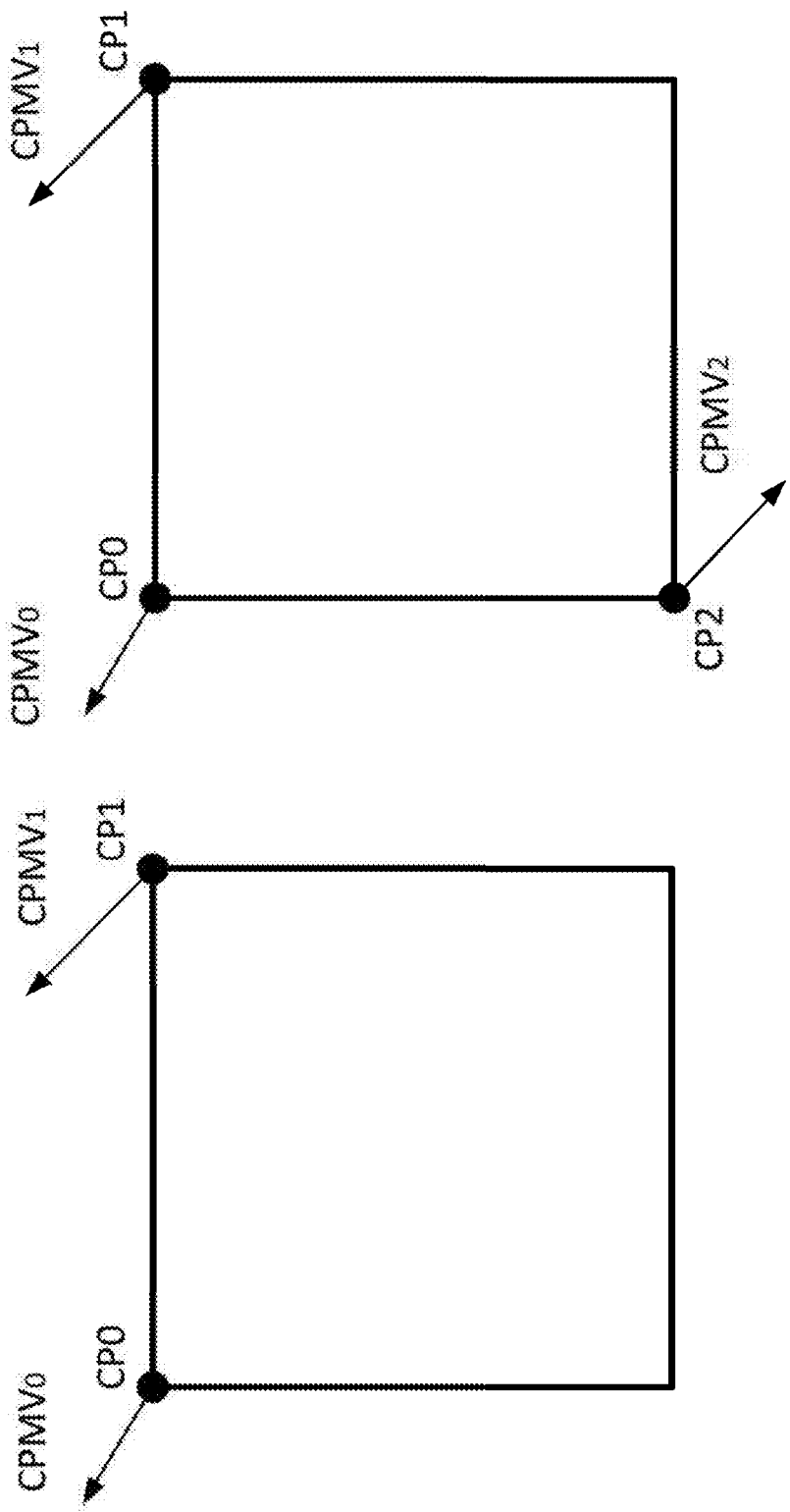
FIG. 13A shows two control point motion vectors (CPMV) for representing a 2-parameter affine model.
FIG. 13B shows three CPMVs for representing a 3-parameter affine model.

In some examples, a translation motion model is applied for motion compensation prediction (MCP). However, the translational motion model may not be suitable for modeling other types of motions, such as zoom in/out, rotation, perspective motions, and the other irregular motions. In some embodiments, a block-based affine transform motion compensation prediction is applied. In FIG. 13A, an affine motion field of a block is described by two control point motion vectors (CPMVs), CPMV0 and CPMV1, of two control points (CPs), CP0 and CP1 when a 4-parameter affine model is used. In FIG. 13B an affine motion field of a block is described by three CPMVs, CPMV0, CPMV1 and CPMV3, of CPs, CP0, CP1, and CP2 when a 6-parameter affine model is used.

For a 4-parameter affine motion model, a motion vector, at a sample location (x, y) in a block is derived as:

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1y} - mv_{0x}}{W}y + mv_{0y} \end{cases} \quad (2.1)$$

For a 6-parameter affine motion model, a motion vector at sample location (x, y) in a block is derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad (2.2)$$

In the expressions (2.1) and (2.2), ($mv_{0x}$, $mv_{0y}$) is a motion vector of the top-left corner control point, ($mv_{1x}$, $mv_{1y}$) is motion vector of the top-right corner control point, and ($mv_{2x}$, $mv_{2y}$) is motion vector of the bottom-left corner control point. In addition, the coordinate (x, y) is with respect to the top-left corner of the respective block, and W and H denotes the width and height of the respective block.

Figure 14:
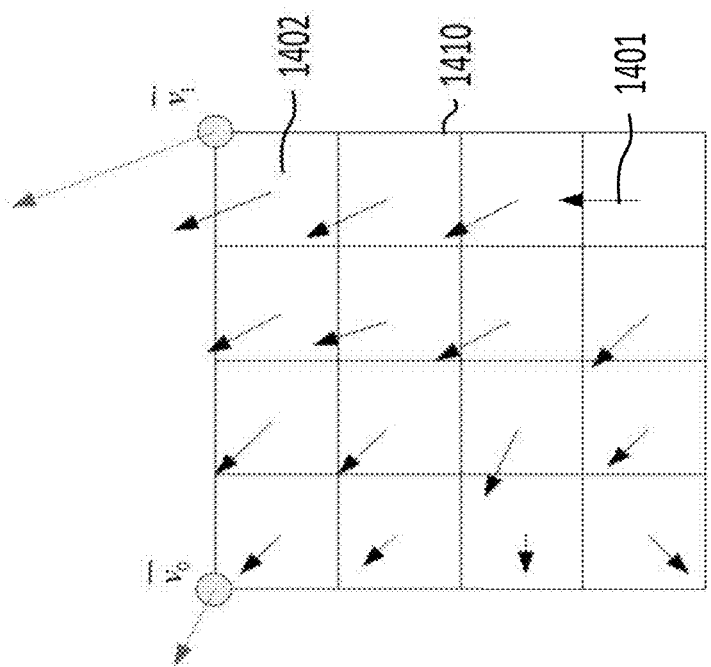
FIG. 14 shows motion vectors derived for sub-blocks partitioned from a current block coded with an affine prediction mode.

In order to simplify the motion compensation prediction, a sub-block based affine transform prediction is applied in some embodiments. For example, in FIG. 14, the 4-parameter affine motion model is used, and two CPMVs, $\overline{v_0}$ and $\overline{v_1}$ are determined. To derive a motion vector of each 4×4 (samples) luma sub-block (1402) partitioned from the current block (1410), a motion vector (1401) of the center sample, of each sub-block (1402) is calculated according to above expressions (2.1), and rounded to a 1/16 fraction accuracy. Then, motion compensation interpolation filters are applied to generate a prediction of each sub-block (1402) with the derived motion vector (1401). The sub-block size of chroma-components is set to be 4×4. A MV of a 4×4 chroma sub-block is calculated as the average of the MVs of the four corresponding 4×4 luma sub-blocks.

Similar to translational motion inter prediction, two affine motion inter prediction modes, affine merge mode and affine AMVP mode, are employed in some embodiments.

3.1 Affine Merge Prediction

In some embodiments, an affine merge mode can be applied for CUs with both width and height larger than or equal to S. Affine merge candidates of a current CU is generated based on motion information of spatial neighboring CUs. There can be up to five affine merge candidates and an index is signaled to indicate the one to be used for the current CU. For example, the following three types of affine merge candidates are used to form an affine merge candidate list:
  (i) Inherited affine merge candidates that are extrapolated from CPMVs of the neighbor CUs;
  (ii) Constructed affine merge candidates that are derived using the translational MVs of the neighbor CUs; and
  (iii) Zero MVs In some embodiments, there can be at most two inherited affine candidates which are derived from affine motion models of the neighboring blocks, one from left neighboring CUs and one from above neighboring CUs. The candidate blocks, for example, can be located at positions shown in FIG. 8. For the left predictor, the scan order is A0→A1, and for the above predictor, the scan order is B0→B1→B2. Only the first inherited candidate from each side is selected. No pruning check is performed between two inherited candidates.

Figure 15:
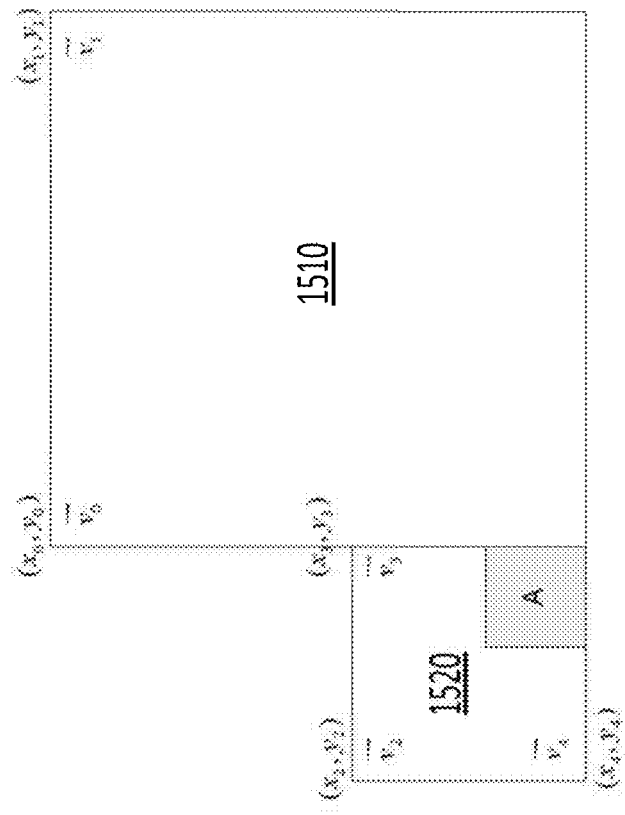
FIG. 15 shows a neighbor block of a current block for deriving an inherited affine merge candidate.

When a neighboring affine CU is identified, CPMVs of the identified neighboring affine CU are used to derive a CPMV candidate in the affine merge list of the current CU. As shown in FIG. 15, a neighbor left bottom block A of a current CU (1510) is coded in an affine mode. Motion vectors, $\overline{v_2}$, $\overline{v_3}$ and $\overline{v_4}$ of the top left corner, above right corner and left bottom corner of a CU (1520) which contains the block A are attained. When block A is coded with a 4-parameter affine model, two CPMVs $\overline{v_0}$ and $\overline{v_1}$ of the current CU (1510) are calculated according to $\overline{v_2}$, and $\overline{v_3}$. In case that block A is coded with 6-parameter affine model, three CPMVs (not shown) of the current CU are calculated according to $\overline{v_2}$, $\overline{v_3}$ and $\overline{v_4}$.

Constructed affine candidates are constructed by combining neighbor translational motion information of each control point. The motion information for the control points is derived from specified spatial neighbors and temporal neighbor shown in FIG. 16. CPMVk (k=1, 2, 3, 4) represents the k-th control point. For CPMV1, the B2→B3→A2 blocks are checked in order and the MV of the first available block is used. For CPMV2, the B1→B0 blocks are checked and for CPMV3, the A1→A0 blocks are checked. A TMVP at block T is used as CPMV4 if available.

After MVs of four control points are attained, affine merge candidates are constructed based on that motion information. The following combinations of control point MVs are used to construct in order: {CPMV1, CPMV2, CPMV3}, {CPMV1, CPMV2, CPMV4}, {CPMV1, CPMV3, CPMV4}, {CPMV2, CPMV3, CPMV4}, {CPMV1, CPMV2}, {CPMV1, CPMV3}.

The combination of 3 CPMVs constructs a 6-parameter affine merge candidate and the combination of 2 CPMVs constructs a 4-parameter affine merge candidate. To avoid a motion scaling process, if the reference indices of control points are different, the related combination of control point MVS is discarded.

After inherited affine merge candidates and constructed affine merge candidates are checked, if the list is still not full, zero MVs are inserted to the end of the merge candidate list.

3.2 Affine AMVP Prediction

In some embodiments, affine AMVP mode can be applied for CUs with both width and height larger than or equal to 16. An affine flag in CU level is signaled in the bitstream to indicate whether affine AMVP mode is used and then another flag is signaled to indicate whether 4-parameter affine or 6-parameter affine is used. A difference of the CPMVs of current and their predictors signaled in the bitstream. An affine AVMP candidate list size is 2, and can be generated by using the following four types of CPVM candidate in order:
  (i) Inherited affine AMVP candidates that are extrapolated from the CPMVs of the neighbor CUs;

(ii) Constructed affine AVMP candidates that are derived using the translation MVs of the neighbor CUs;
(iii) Translational MVs from neighboring CUs; and
(iv) Zero MVs.

The checking order of inherited affine AMVP candidates is similar to the checking order of inherited affine merge candidates in an example. The difference is that, for AMVP candidate, the affine CU that has the same reference picture as in current block is considered. No pruning process is applied when inserting an inherited affine motion predictor into the candidate list.

Figure 16:
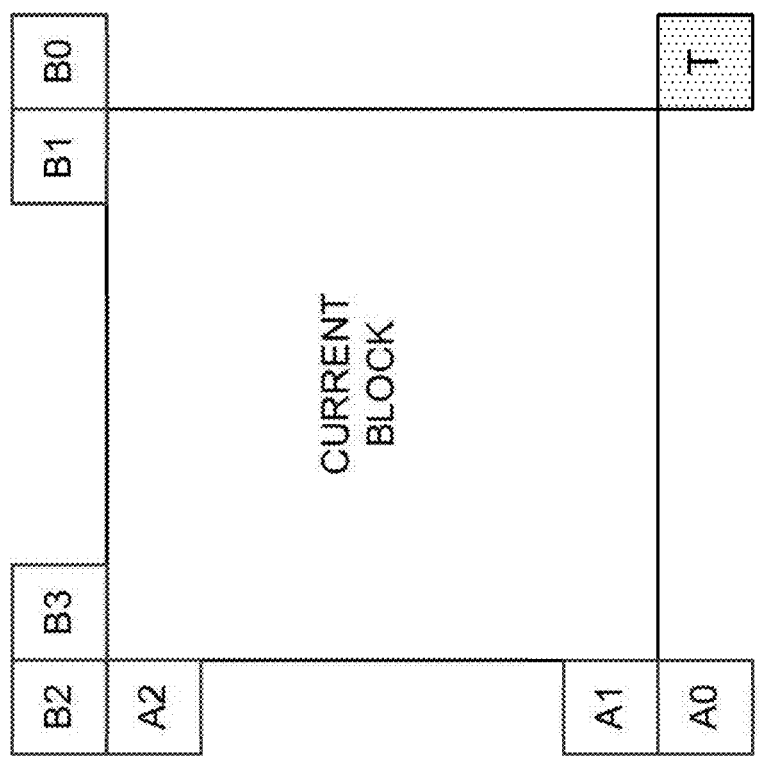
FIG. 16 shows candidate block positions for deriving constructed affine merge candidates.

Constructed AMVP candidate is derived from the specified spatial neighbors shown in FIG. 16. A same checking order is used as done in affine merge candidate construction. In addition, a reference picture index of a neighboring block is also checked. The first block in the checking order that is inter coded and has the same reference picture as in current CUs is used. When the current CU is coded with a 4-parameter affine model, and CPMV0 and CPMV1 are both available, the available CPMVs are added as one candidate in the affine AMVP list. When the current CU is coded with 6-parameter affine mode, and all three CPMVs (CPMV0, CPMV1, and CPMV2) are available, the available CPMVs are added as one candidate in the affine AMVP list. Otherwise, constructed AMVP candidates are set as unavailable.

AMVP list candidates is still less than 2 after is affine AMVP candidates and constructed AMVP candidate are checked, translational motion vectors neighboring the control points will be added to predict all control point MVs of the current CU, when available. Finally, zero MVs are used to fill the affine AMVP list if the affine AMVP list is still not full.

4. Subblock-Based Temporal Motion Vector Prediction (SbTMVP)

Figure 17A:
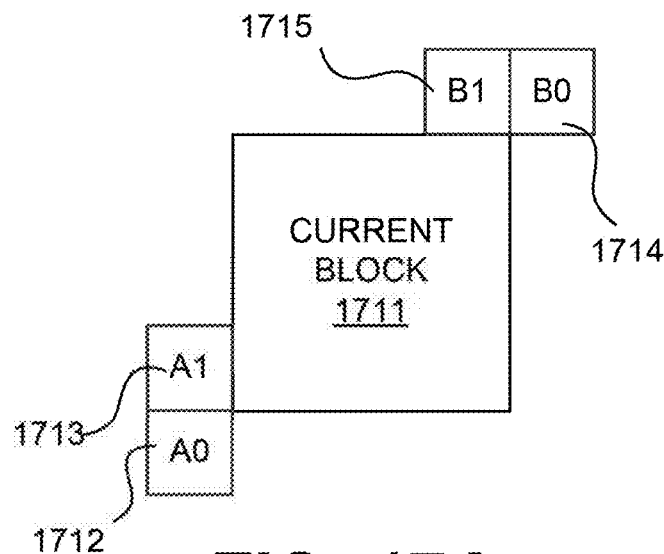
FIG. 17A is a schematic illustration of spatial neighboring blocks that can be used to determine predicting motion information for a current block using a sub-block based temporal motion vector prediction (sbTMVP) method based on motion information of the spatial neighboring blocks in accordance with one embodiment.

FIG. 17A is a schematic illustration of spatial neighboring blocks that can be used to determine predicting motion information for a current block (1711) using a sub-block based temporal MV prediction (SbTMVP) method in accordance with one embodiment. FIG. 17A shows a current block (1711) and its spatial neighboring blocks denoted A0, A1, B0, and B1 (1712, 1713, 1714, and 1715, respectively). In some examples, spatial neighboring blocks A0, A1, B0, and B1 and the current block (1711) belong to a same picture.

Figure 17B:
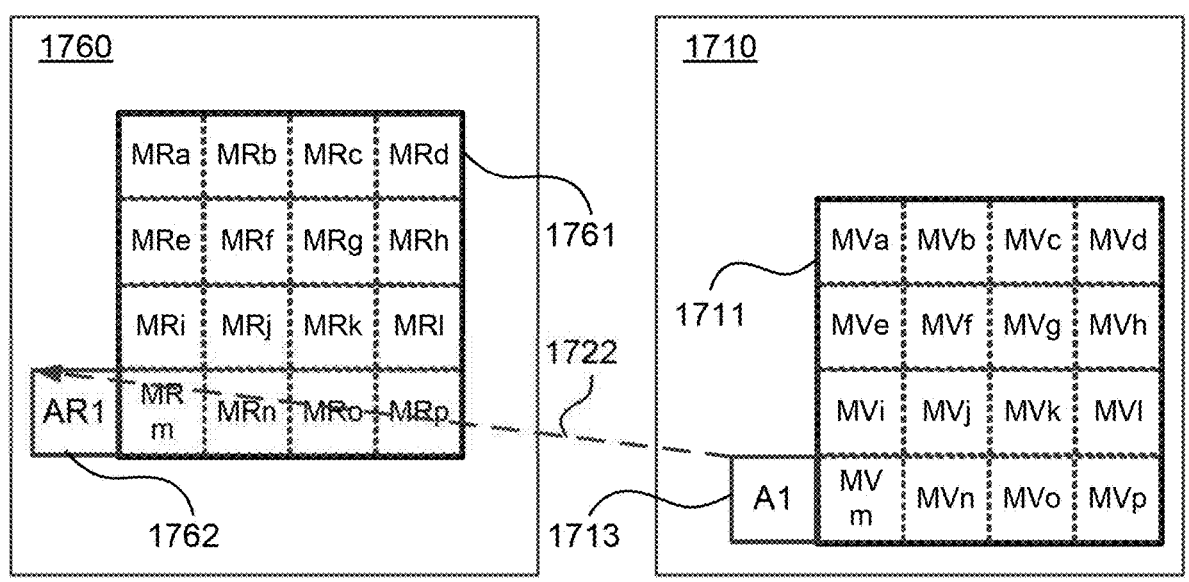
FIG. 17B is a schematic illustration of a selected spatial neighboring block for a SbTMVP method in accordance with one embodiment.

FIG. 17B is a schematic illustration of determining motion information for sub-blocks of the current block (1711) using the SbTMVP method based on a selected spatial neighboring block, such as block A1 in this non-limiting example, in accordance with an embodiment. In this example, the current block (1711) is in a current picture (1710), and a reference block (1761) is in a reference picture (1760) and can be identified based on a motion shift (or displacement) between the current block (1711) and the reference block (1761) indicated by a motion vector (1722).

In some embodiments, similar to a temporal motion vector prediction (TMVP) in HEVC, a SbTMVP uses the motion information in various reference sub-blocks in a reference picture for a current block in a current picture. In some embodiments, the same reference picture used by TMVP can be used for SbTVMP. In some embodiments, TMVP predicts motion information at a CU level but SbTMVP predicts motion at a sub-CU level. In some embodiments, TMVP uses the temporal motion Vectors from collocated block in the reference picture, which has a corresponding position adjacent to a lower-right corner or a center of a current block, and SbTMVP uses the temporal motion vectors from a reference block, which can be identified by performing a motion shift based on a motion vector from one of the spatial neighboring blocks of the current block.

For example, as shown in FIG. 17A, neighboring blocks A1, B1, B0, and A0 can be sequentially checked in a SbTVMP process. As soon as a first spatial neighboring block that has a motion vector that uses the reference picture (1760) as its reference picture is identified, such as block A1 having the motion vector (1722) that points to a reference block AR1 in the reference picture (1760) for example, this motion vector (1722) can be used for performing the motion shift. If no such motion vector is available from the spatial neighboring blocks A1, B1, B0 and A0, the motion shift is set to (0, 0).

After determining the motion shift, the reference block (1761) can be identified based on a position of the current block (1711) and the determined motion shift. In FIG. 17B, the reference block (1761) can be further divided into 16 sub-blocks with reference motion information MRa through MRp. In some examples, the reference motion information for each sub-block in the reference block (1761) can be determined based on a smallest motion grid that covers a center sample of such sub-block. The motion information can include motion vectors and corresponding reference indices. The current block (1711) can be further divided into 16 sub-blocks, and the motion information MVa through MVp for the sub-blocks in the current block (1711) can be derived front the reference motion information MRa through MRp in a manner similar to the TMVP process, with temporal scaling in some examples.

The sub-block size used in the SbTMVP process can be fixed (or otherwise predetermined) or signaled. In some examples, the sub-block size used in the SbTMVP process can be 8×8 samples. In some examples, the SbTMVP process is only applicable to a block with a width and height equal to or greater than the fixed or signaled size, for example 8 pixels.

In an example, a combined sub-block based merge list which contains a SbTVMP candidate and affine merge candidates is used for the signaling of a sub-block based merge mode. The SbTVMP mode can be enabled or disabled by a sequence parameter set (SPS) flag. In some examples, if the SbTMVP mode is enabled, the SbTMVP candidate is added the first entry of the list of sub-block based merge candidates, and followed by the affine merge candidates. In some embodiments, the maximum allowed size of the sub-block based merge list is set to five. However, other sizes may be utilized in other embodiments.

In some embodiments, the encoding logic of the additional SbTMVP merge candidate is the same as for the other merge candidates. That is, for each block in a P or B slice, an additional rate-distortion check can be performed to determine whether to use the SbTMVP candidate.

5. Triangular Prediction

A triangular prediction mode (TPM) can be employed for inter prediction in some embodiments. In an embodiment, the TPM is applied to CUs that are 8×8 samples or larger in size and are coded in skip or merge mode. In an embodiment, for a CU satisfying these conditions (8×8 samples or larger in size and coded in, skip or merge mode), a CU-level flag is signaled to indicate whether the TPM is applied or not.

Figure 18:
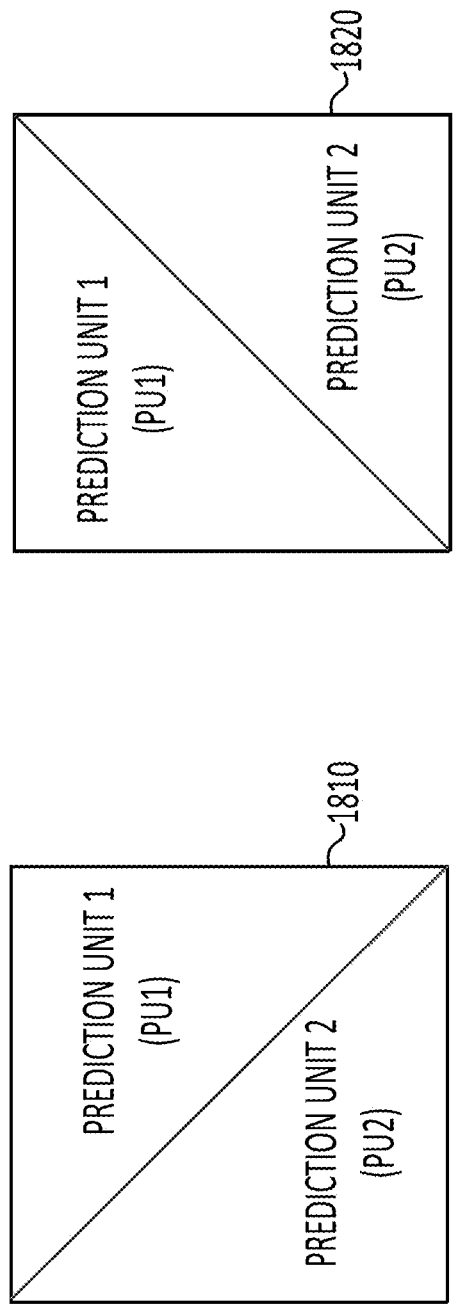
FIG. 18 shows examples of partitioning a coding unit into two triangular prediction units in accordance with an embodiment.

When the TPM is used, in some embodiments, a Cu is split evenly into two triangle-shaped partitions, using either the diagonal split or the anti-diagonal split as shown in FIG. 18. In FIG. 18, a first CU (1810) is split from a top-left corner to a bottom-right corner resulting in two triangular prediction units, PU1 and PU2. A second CU (1820) is split from a top-right corner to a bottom-left corner resulting in two triangular prediction units, PU1 and PU2. Each triangular prediction unit PU1 or PU2 in the CU (1810) or (1820) is inter-predicted using its own'motion information.

In some embodiments, only uni-prediction is allowed for each triangular prediction unit. Accordingly, each triangular prediction unit has one motion vector and one reference picture index. The uni-prediction motion constraint can be applied to ensure that, similar to a conventional bi-prediction method, not more than two motion compensated predictions are performed for each CU. In this way, processing complexity can be reduced. The uni-prediction motion information for each triangular prediction unit can be derived from a prediction merge candidate list. In some other embodiments, bi-prediction is allowed for each triangular prediction unit. Accordingly, the bi-prediction motion information for each triangular prediction unit can be derived from a bi-prediction merge candidate list.

In some embodiments, when a CU-level flan indicates that a current CU is coded using the TPM, an index, referred to as triangle partition index, is further signaled. For example, the triangle partition index can have a value in a range of (0, 39). Using this triangle partition index, the direction of the triangle partition (diagonal or anti-diagonal), as well as the motion information for each of the partitions (e.g., merge indices (or referred to as TPM indices) to the respective uni-prediction candidate list) can be obtained through a look-up table at the decoder side.

After predicting each of the triangular prediction unit based on the obtained motion information, in an embodiment, the sample values along the diagonal or anti-diagonal edge of the current CU are adjusted by performing a blending process with adaptive weights. As a result of the blending process, a prediction signal for the whole CU can be obtained. Subsequently, a transform and quantization process can be applied to the whole CU in a way similar to other prediction modes. Finally, a motion field of a CU predicted using the triangle partition mode can be created, for example, by storing motion information in a set of 4×4 units partitioned from the CU. The motion field can be used, for example, in a subsequent motion vector prediction process to construct a merge candidate list.

5.1 Uni-Prediction Candidate List Construction

Figure 19:
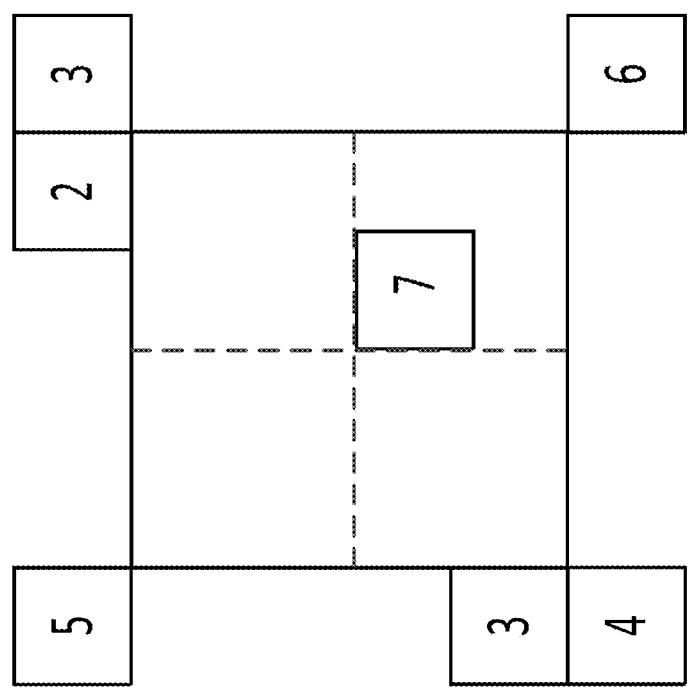
FIG. 19 shows spatial and temporal neighboring blocks used to construct a uni-prediction candidate list for a triangular prediction mode in accordance with an embodiment.

In some embodiments, a merge candidate list for prediction of two triangular prediction units of a coding block processed with a TPM can be constructed based on a set of spatial and temporal neighboring blocks of the coding block. Such a merge candidate list can be referred to as a TPM candidate list with TPM candidates listed herein. In one embodiment, the merge candidate list is a uni-prediction candidate list. The uni-prediction candidate list includes five uni-prediction motion vector candidates in an embodiment. For example, the five uni-prediction motion vector candidates are derived from seven neighboring blocks including five spatial neighboring blocks (labelled with numbers of 1 to 5 in FIG. 19) and two temporal co-located blocks (labelled with numbers of 6 to 7 in FIG. 19).

In an example, the motion vectors of the seven neighboring blocks are collected and put into the uni-prediction candidate list according to the following order: first, the motion vectors of the uni-predicted neighboring blocks: then, for the bi-predicted neighboring blocks, the L0 motion vectors (that is, the L0 motion vector part of the bi-prediction MV), the L1 motion vectors (that is, the L1 motion vector part of the bi-prediction MV), and averaged motion vectors of the L0 and L1 motion vectors of the bi-prediction MVs. In an example, if the number of candidates is less than five, zero motion vectors are added to the end of the list. In some other embodiments, the merge candidate list may include less than 5 or more than 5 uni-prediction or bi-prediction merge candidates that are selected from candidate positions that are the same or different from that shown in FIG. 19.

5.2 Lookup Table and Table Indices

In an embodiment, a CU is coded with a triangular partition mode with a TPM (or merge) candidate list including five TPM candidates. Accordingly, there are 40 possible ways to predict the CU when 5 merge candidates are used for each triangular PU. In other words, there can be 40 different combinations of split directions and merge (or TPM) indices: 2 (possible split directions)×(5 (possible merge indices for a first triangular prediction unit)×5 (possible merge indices for a second triangular prediction unit)−5 (a number of possibilities when the pair of first and second prediction units shares a same merge index)). For example, when a same merge index is determined for the two triangular prediction units, the CU can be processed using a regular merge mode, instead of the triangular predication mode.

Accordingly in an embodiment, a triangular partition index in the range of [0, 39] can be used to represent which one of the 40 combinations is used based on a lookup table. FIG. 20 shows an exemplary lookup table (2000) used to derive the split direction and merge indices based on a triangular partition index. As shown in the lookup table (2000), a first row (2001) includes the triangular partition indices ranging from 0 to 39; a second row (2002) includes possible split directions represented by 0 or 1; a third row (2003) includes possible first merge indices corresponding to a first triangular prediction unit and ranging from 0 to 4; and, a fourth row 2004 includes possible second merge indices corresponding to a second triangular prediction unit and ranging from 0 to 4.

For example, when a triangular partition index having a value of 1 is received at a decoder, based on a column (2020) of the lookup table (2000), it can be determined that the split direction is a partition direction represented by the value of 1, and the first and second merge indices are 0 and 1, respectively. As the triangle partition indices are associated with a lookup table, a triangle partition index is also referred to as a table index in this disclosure.

5.3 Adaptive Blending Along the Triangular Partition Edge

In an embodiment, after predicting each triangular prediction unit using respective motion information, a blending process is applied to the two prediction signals of the two triangular prediction units to derive samples around the diagonal or anti-diagonal edge. The blending process adaptively chooses between two groups of weighting factors depending on the motion vector difference between the two triangular prediction units. In an embodiment, the two weighting factor groups are as follows:

(1) 1st weighting factor group: {7/8, 6/8, 4/8, 2/8, 1/8} for samples of a luma component and {7/8, 4/8, 1/8} for samples of chroma component; and (2) 2nd weighting factor group: {7/8, 6/8, 5/8, 4/8, 38, 2/8, 1/8} for samples of a luma component and {6/8, 4/8, 2/8} for samples of a chroma component.

The second weighting factor group has more luma weighting factors and blends, more luma samples along the partition edge.

In an embodiment, the following condition is used to select one of the two weighting factor groups. When reference pictures of the two triangle partitions are different from each other, or when a motion vector difference between the two triangle partitions is larger than a threshold (e.g., 16 luma samples), the 2nd weighting factor group is selected. Otherwise, the 1st weighting factor group is selected.

Figure 21:
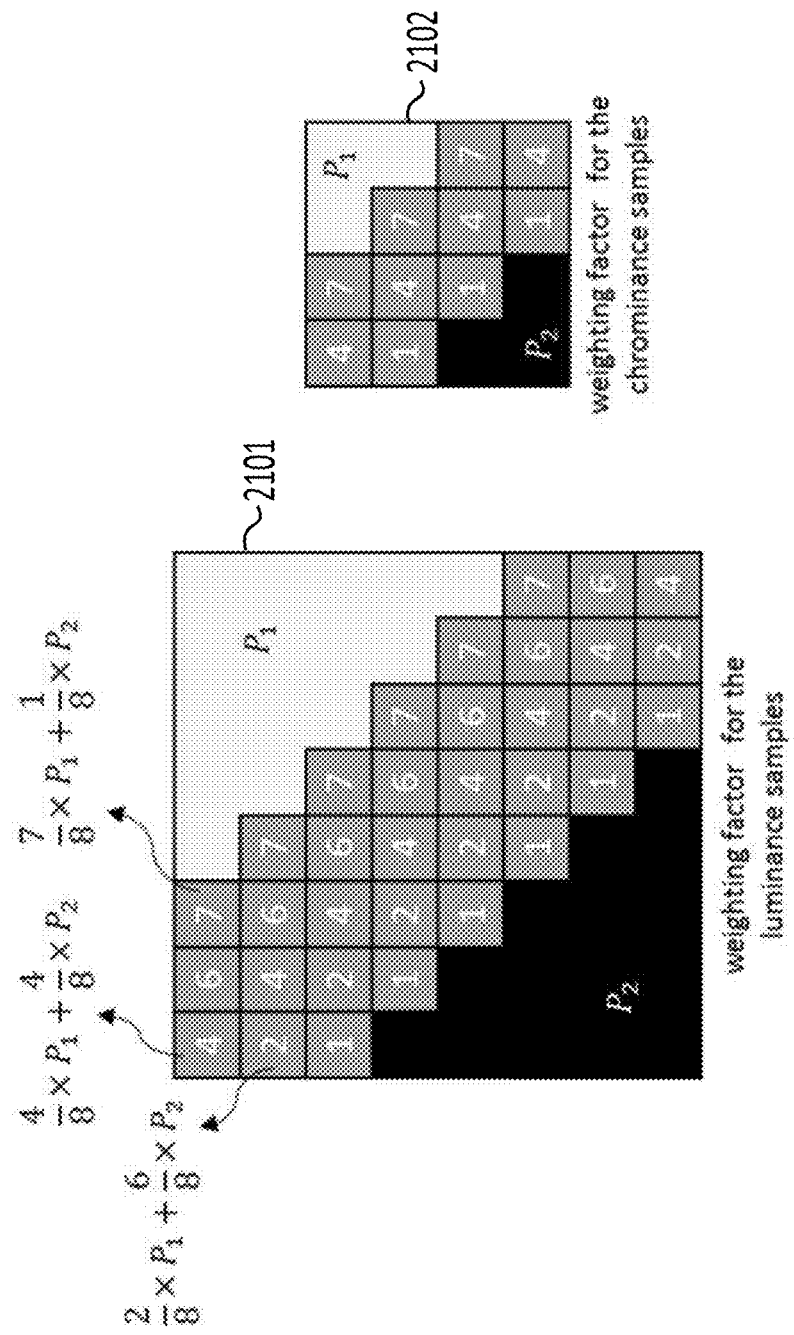
FIG. 21 shows weighting factors applied to a coding unit in an adaptive blending process in accordance with an embodiment.

FIG. 21 shows an example of a CU applying the first weighting factor group. As shown, a first coding block (2101) includes luma samples, and a second coding block (2102) includes chroma samples. A set of pixels along a diagonal edge in the coding block (2101) or (2102) are labeled with the numbers 1, 2, 4, 6, and 7 corresponding to the weighting factors 7/8, 6/8, 4/8, 2/8, and 1/8, respectively. Far example, for a pixel labelled with the number of 2, a sample value of the pixel after a blending operation can be obtained according to:

$$\text{the blended sample value} = 2/8 \times P1 + 6/8 \times P2,$$

where P1 and P2 represent sample values at the respective pixel but belonging to predictions of a first triangular prediction unit and a second triangular prediction unit, respectively.

6. Combined Inter and Intro Prediction (CIIP)

In some embodiments, when a CU is coded in merge mode, and if the CU contains at least 64 luma samples (that is, CU width times CU height is equal to, or larger than 64), an additional flag is signaled to indicate if a combined inter/intra prediction (CIIP) mode is applied to the current CU.

In order to form a CIIP prediction, an intra prediction mode is first derived from two additional syntax elements. Up to four possible intra prediction modes can be used: DC, planar, horizontal, or vertical. Then, the inter prediction and intra prediction signals are derived using regular intra and inter decoding processes. Finally, weighted averaging of the inter and intra prediction signals is performed to obtain the CIIP prediction.

6.1 Intra Prediction Mode Derivation

In an embodiment, up to 4 intra prediction modes, including dc, planar, horizontal, and vertical modes, can be used to predict the luma component in the CIIP mode. If the CU shape is very wide (that is, width is more than two times of height), then the horizontal mode is not allowed. If the CU shape is very narrow (that is, height is more than two times of width), then the vertical mode is not allowed. In these cases, only 3 intra prediction modes are allowed.

The CIIP mode uses 3 most probable modes (MPM) for intra prediction. The CIIP MPM candidate list is formed as follows:

(i) The left and top neighbouring blocks are set as A and B, respectively;

(ii) The intra prediction modes of block A and block B, denoted as intraModeA and intraModeB, respectively, are derived as follows:
  a. Let X be either A or B,
  b. intraModeX is set to DC if 1) block X is not available; or 2) block X is not predicted using the CIIP mode or the intra mode; or 3) block X is outside of the current CTU, and
  c. otherwise, intraModeX is set to 1) dc or planar if the intra prediction mode of block X is dc or planar; or 2) vertical if the intra prediction mode of block X is a "vertical-like" angular mode (larger than 34), or 3) horizontal if the intra prediction mode of block X is a "horizontal-like" angular mode (smaller than or equal to 34);

(iii) If intralModeA and intraModeB are the same:
  a. If intraModeA is planar or dc, then the three MPMs are set to {planar, dc, vertical} in that order, and
  b. Otherwise, the three MPMs are set to {intraModeA, planar, dc} in that order; and (iv) Otherwise (intraModeA and intraModeB are different):
  a. The first two MPMs are set to {intraModeA, innaModeB} in that order
  b. Uniqueness of planar, dc and vertical is checked in that order against the first two MPM candidate modes; as soon as a unique mode is found, it is added to as the third MPM.

If the CU shape is very wide or very narrow as defined above, the MPM flag is inferred to be 1 without signaling. Otherwise, an MPM flag is signaled to indicate if the CIIP intra prediction mode is one of the CIIP MPM candidate modes.

If the MPM flag is MPM index is further signaled to indicate which one of the MPM candidate modes is used in CIIP intra prediction. Otherwise, if the MPM flag is 0, the intra prediction mode is set to the "missing" mode in the MPM candidate list. For example, if the planar mode is not in the MPM candidate list, then planar is the missing mode, and the intra prediction mode is set to planar. Since 4 possible intra prediction modes are allowed in CIIP, and the MPM candidate list contains only 3 intra prediction modes, one of the 4 possible modes can be the missing mode.

For the chroma components, the DIM mode is applied without additional signaling. For example, chroma uses the same prediction mode as luma.

The intra prediction mode of a CIIP-coded CU will be saved and used in the intra mode coding of the future neighboring CUs.

6.2 Combining the Inter and Intra Prediction Signals

In an embodiment, the inter prediction signal in the CIIP mode P_inter is derived using the same inter prediction process applied to regular merge mode, and the intra prediction signal P_intra is derived using the CIIP intra prediction mode following the regular intra prediction process. Then, the intra and inter prediction signals are combined using weighted averaging, where the weight value depends on the intra prediction mode and where the sample is located in the coding block, in the following way.

If the intra prediction mode is the DC or planar mode, or if the block width or height is smaller than 4, then equal weights are applied to the intra prediction and the inter prediction signals.

Otherwise, the weights are determined based on the intra prediction mode (either horizontal mode or vertical mode in this case) and the sample location in the block. Take the horizontal prediction mode, as an example (the weights for the vertical mode are derived similarly but in the orthogonal direction). Let W denote the width of the block and H denote the height of the block. The coding block is first split into four equal-area parts, each of the dimension (W/4)×H. Starting from the part closest to the intra prediction reference samples and ending at the part farthest away from the intra prediction reference samples, the weight wt for each of the 4 regions is set to 6, 5, 3, and 2, respectively. The final CIIP prediction signal is derived using the following:

$$P\_\text{"CIIP"}=((8-wt)*P\_inter+wt*P\_intra+4)>>3 \quad (3)$$

III. Interweaved Affine Prediction

Figure 22:
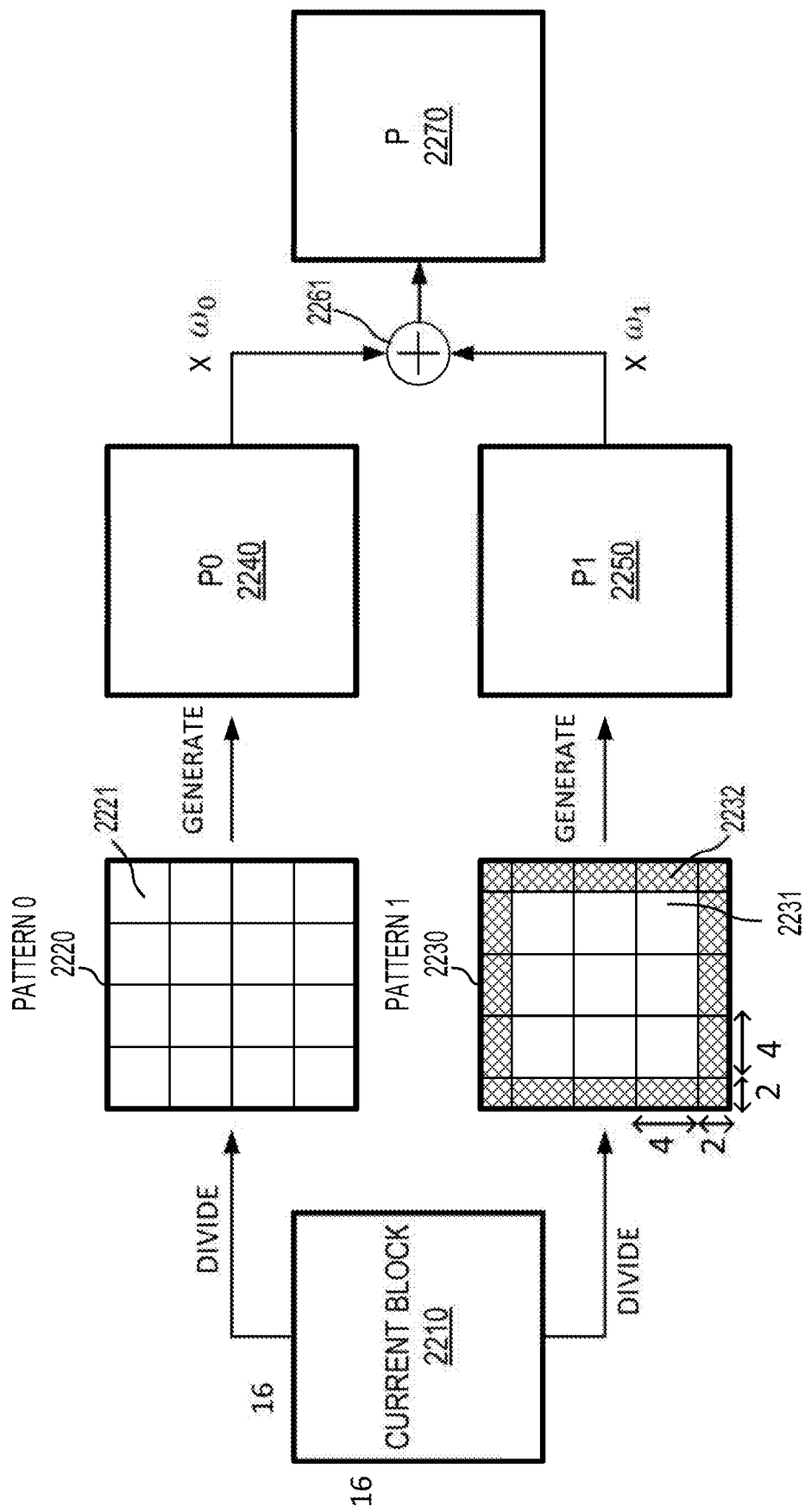
FIG. 22 shows an interweaved affine prediction process in accordance with an embodiment.

In some embodiments, interweaved affine prediction is used. For example, as shown in FIG. 22, a current block (2210) with a size of 16×16 samples is divided into sub-blocks with two different dividing patterns, Pattern 0 (2220) and Pattern 1 (2230). With Pattern 0 (2220), the current block (2210) is divided into, the sub-blocks (2221) with an equal size of 4×4. In contrast, Pattern 1 (2230) is shifted by a 2×2 offset with respect to Pattern 0 (2220) towards the lower-right corner of the current block (2210). With Pattern 1 (2230), the current block (2210) is partitioned into the whole sub-blocks (2231) each with a size of 4×4, and the fractional sub-blocks (2232) each having a size smaller than the size of 4×4. In FIG. 22, the fractional sub-blocks (2232) form a shaded area surrounding a non-shaded area formed by the whole sub-blocks (2231).

Subsequently, two auxiliary predictions, P0 (2240) and P1 (2250), corresponding to the two dividing patterns (2220) and (2230) are generated by affine motion compensation (AMC). For example, an affine model can be determined from an affine merge candidate on a sub-block based merge candidate list, A MV for each sub-block partitioned from Pattern 0 (2220) and (2230) can be derived based on the affine model. For example, the MVs can each start from a center position of the respective sub-block.

Figure 23:
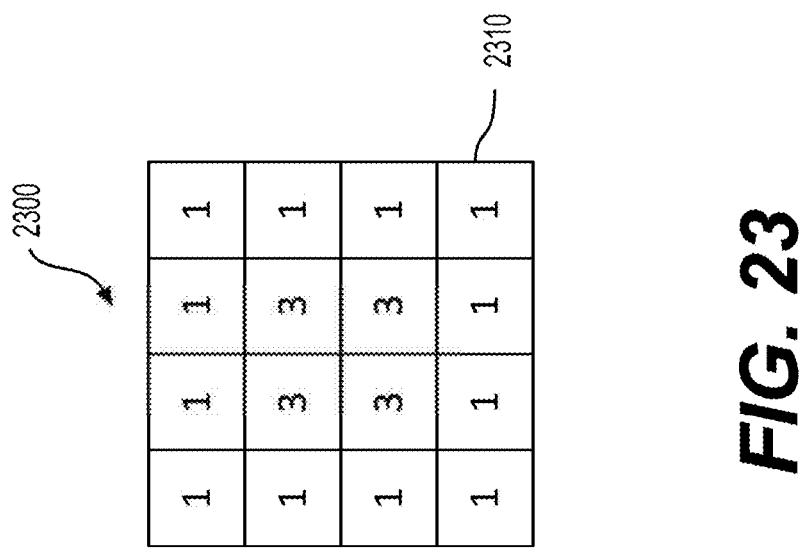
FIG. 23 shows a pattern of weights of a weighted average operation in an interweaved affine prediction process in accordance with an embodiment.

Thereafter, a final prediction (2270) is calculated by combining the two predictions P0 (2240) and P1 (2250). For example, a weighted average operation (2261) can be performed to calculate a weighted average of two corresponding samples (denoted by $P_0$ and $P_1$) in the two predictions P0 (2240) and P1 (2250) pixel by pixel, according to:

$$\begin{cases} P = (P_0 + P_1) >> 1, \text{ if } \omega_0 = \omega_1 \\ P = (\omega_0 P_0 + \omega_1 P_1) >> 2 \text{ Otherwise} \end{cases} \quad (3.1)$$

where $\omega_0$ and $\omega_1$ are the weights corresponding to the pair of co-located samples in the two predictions P0 (2240) and P1 (2250), respectively, In an embodiment, the weight of each sample in the weighted average operation (2261) can be determined according to a pattern (2300) shown in FIG. 23. The pattern (2300) includes 16 samples included in a sub-block 2310 (e.g., a whole sub-block (2221) or (2231)). An prediction sample located at the center of the sub-block (2310) is associated with a weighting value of 3, while a prediction sample located at the boundary of the sub-block (2310) is associated with a weighting value 1. Depending on a position of a sample within a sub-block (2221) or (2231), a weight corresponding to the sample can be determined based on, the pattern (2300).

In an embodiment, to avoid tiny block motion compensation, the interweaved prediction is only applied on regions where the size of sub-blocks is 4×4 for both the two dividing patterns as shown in FIG. 22. For example, in the shaded area of Pattern 1 (2230), no interweaved prediction is applied, and in the non-shaded area of Pattern 1 (2230), the interweaved prediction is applied.

In an embodiment, an interweaved prediction is applied on chroma components as well as the luma component. In addition, according to the disclosure, a memory access bandwidth is not increased by interweaved prediction since an area of a reference picture used for the AMC for all sub-blocks is fetched together as a whole. No additional reading operation is needed.

Further, for flexibility, a flag is signaled in slice header to indicate whether interweaved prediction is used or not. In an example, the flag is always signaled to be 1. In various embodiments, interweaved affine prediction can be applied on uni-predicted affine blocks, or on both uni-predicted and bi-predicted affine blocks.

IV. Weighted Prediction

In some embodiments, a weighted sample prediction process for bi-predicted block and uni-predicted block is employed.

In an embodiment, inputs to the weighted sample prediction process are:
  two variables nCbW and nCbH specifying the width and the height of a current coding block,
  two (nCbW)×(nCbH) arrays predSamplesL0 and predSamplesL1 each including intermediate prediction sample values,
  prediction list utilization flags predFlagL0 and predFlagL1,
  reference indices refIdxL0 and refIdxL1,
  a bi-prediction weight index gbiIdx.
  a sample bit depth, bitDepth.

Output of the weighted sample prediction process is a (nChW)×(nCbH) array pbSamples of prediction sample values.

Variables shift1, shift2, offset1, offset2, and offset3 are derived as follows:
  The variable shift1 is set equal to Max(2, 14−bitDepth) and the variable shift2, is set equal to Max(3, 15−bitDepth).
  The variable offset1 is set equal to 1<<(shift1−1).
  The variable offset2 is set equal to 1<<(shift2−1).
  The variable offset3 is set equal to 1<<(shift2+2).

Depending on the values of predFlagL0 and predFlagL1, the prediction samples pbSamples[x][y] with x=0 . . . (nCbW−1) and y=0 . . . (nCbH−1) are derived as follows:

(1) If predFlagL0 is equal to 1 and predFlagL1 is equal to 0, the prediction sample values are derived as follows:

$$pbSamples[x][y]=\text{Clip3}(0,(1<<bitDepth)-1,(predSamplesL0[x][y]+offset1)>>shift1) \quad (4.1)$$

(2) Otherwise, if predFlagL0 is equal dot and predFlagL1 is equal to 1, the prediction sample values are derived as follows:

$$pbSamples[x][y]=\text{Clip3}(0,(1<<bitDepth)-1,(predSamplesL1[x][y]+offset1)>>shift1) \quad (4.2)$$

(3) Otherwise (predFlagL0 is equal to 1 and predFlagL1 is equal to 1), the following applies:
(i) gbiIdx is equal to 0, the prediction sample values are derived as follows:

$$pbSamples[x][y]=\text{Clip3}(0,(1<<\text{bitDepth})-1,(\text{predSamplesL0}[x][y]+\text{predSamplesL1}[x][y]+\text{offset2}) >>\text{shift2}) \quad (4.3)$$

(ii) Otherwise (gbiIdx is not equal to 0), the following applies:
The variable w1 is set equal to gbiWLut[gbiIdx] with gbiWLut[k]={4, 5, 3, 10, −2}. The variable w0 is set equal to (8−w1). The prediction sample values are derived as follows:

$$pbSamples[x][y]=\text{Clip3}(0,(1<<\text{bitDepth})-1, (w0*\text{predSamplesL0}[x][y]+w1*\text{predSamplesL1}[x][y]+\text{offset3})>>(\text{shift2}+3)). \quad (4.4)$$

V. High Accuracy Interweaved Affine Prediction

1. Low Precision Interweaved Affine Prediction

In the FIG. 22 example, in order to generate the two predictions (2240) and (2250) corresponding to the two partitioning patterns (2220) and (2230), the affine motion compensation (AMP) process is performed. For example, based on an affine model, MVs corresponding to the 16 sub-blocks (2221) and 9 sub-blocks (2231) are determined. Those MVs can be of a sub-pixel precision (e.g., half-pixel, quarter-pixel, one-eighth pixel, or one-sixteenth precision). Accordingly, corresponding to the sub-pixel precision of the MVs, an interpolation process is performed to generate interpolated samples in a reference picture. Sub-block predictions of the sub-blocks (2221) and (2231) can be searched for over the interpolated reference picture with interpolated samples.

During the above interpolation process, an intermediate bit-depth (e.g., 16 bits) higher than an input bit-depth (e.g., 10 bits) of the interpolated reference picture or the current block (2210) can be employed. Thus, the sub-block predictions (or predictors) may include samples of a high precision (or accuracy) corresponding the intermediate bit-depth compared with the low precision corresponding to the input bit-depth.

In the FIG. 22 example, high precision sample values of the sub-block predictions (or predictors) are converted to low precision sample values before stored in the prediction blocks (2240) and (2250). For example, by a right shifting operation, the intermediate bit-depth (16 bits) is rounded to the input bit-depth (e.g., 10 bits). Thereafter, the weighted average operation (2261) is performed pixel by pixel with the low precision (e.g., the input-bit depth) to obtain the final prediction (2270).

The above precision conversion operation and weighted average operation (2262) in the FIG. 22 example can be jointly represented by the following expressions:

$$\text{Prod}=((\text{Interp}(P0))>>\text{shift1})*w0)+ (\text{Interp}(P1)>>\text{shift1}*w1)+\text{offset1})/(w0+w1) \quad (5.1)$$

where Pred denotes a value of a sample in the final prediction (2270), Interp(P0) and Inter(P1) each denote a value of an interpolated sample with a high precision corresponding to the pattern (2220) or (2230), respectively, w0 and w1 denotes weights associated with the respective interpolated samples, and offset1 denotes a rounding offset.

As indicated by the expression (5.1), Interp(P0) and Interp(P1) are converted from the high precision to the low precision before the weighted average operation is performed.

2. High Precision Interweaved Affine Prediction

Figure 24:
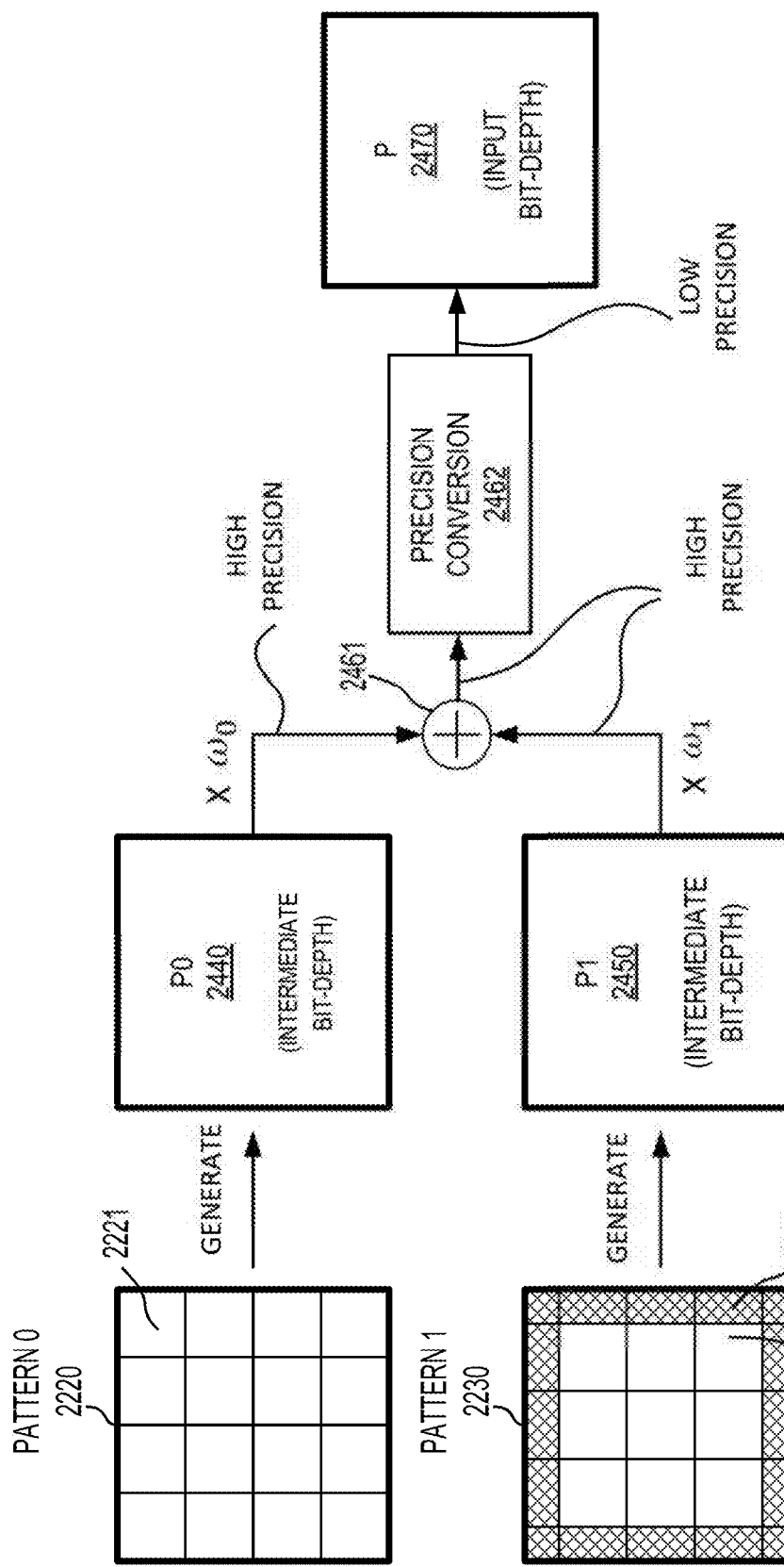
FIG. 24 shows an interweaved of fine prediction process with a high precision in accordance with an embodiment.

FIG. 24 shows an interweaved affine prediction process 2400 according to an embodiment of the disclosure. The process 2400 is similar to the process, in the FIG. 22 example, however, can generate a final prediction (2470) with a higher accuracy.

As shown, two predictions (2440) and (2450) corresponding, to the partitioning patterns (2220) and (2230) can be generated as a result of an AMC process, Particularly, interpolated samples with an intermediate bit-depth (e.g., 16 bits) larger than an input bit-depth (e.g., 10 bits) can be stored in the predictions (2440) and (2450). In addition, the predictions (2440) and (2450) may include original samples, but those original samples may be represented with the intermediate bit-depth (e.g., converted from the input bit-depth to the intermediate bit-depth). Thus, high precision sample values (e.g, a bit-depth of 16 bits) are contained in the prediction blocks (2440) and (2450). In contrast, the predictions (2240) and (2250) contain low precision sample values (e.g., a bit-depth of 10 bits) in the FIG. 22 example.

Thereafter, a weighted average operation (2461) similar to that of the FIG. 22 example can be performed pixel by pixel, however, with pairs of the collocated sample values having the high precision as input. An averaged sample value resulting from the weighted average operation (2461) can still have the high precision.

Following the weighted average operation (2461), pixel by pixel, a precision conversion operation (2462) can be performed to convert averaged sample values resulting from the weighted average operation (2461) to generate final sample values of the final prediction (2470). For example, the averaged sample values are converted from the intermediate bit-depth of 16 bits to the input bit-depth of 10 bits.

The process 2400 can be represented by the following expression:

$$\text{Pred}=\{(\text{Interp}(P0)*w0)+(\text{Interp}(P1)*w1)+\text{offset2}/ (w0+w1)\}>>\text{shift} \quad (5.2)$$

A variant of the expression is:

$$\text{Pred}=((\text{Interp}(P0)*w0)+(\text{Interp}(P1)*w1)+\text{offset3}/ \{(w0+w1)<<\text{shift}\} \quad (5.3)$$

In the expression (5.2), a sample value resulting from the weighted average operation is right shifted to be converted from the intermediate bit depth to the input bit-depth. In contrast, in the expression (5.3), the average operation (1/(w0+w1)) and the right shift operation (>>shift) are combined together to divide a weighted sum. The offset2 and offset3 are rounding offsets. Adding a rounding offset to a value that is to be averaged or right shifted can generally improve a calculation precision.

Compared with the FIG. 22 example, in the process 2400, the high precision is maintained until after the weighted average operation instead of using input low precision sample values to the weighted average operation. As a result, the sample values of the final prediction (2470) can have a higher accuracy, and performance of the interweaved affine prediction process 2400 can be improved.

Figure 25:
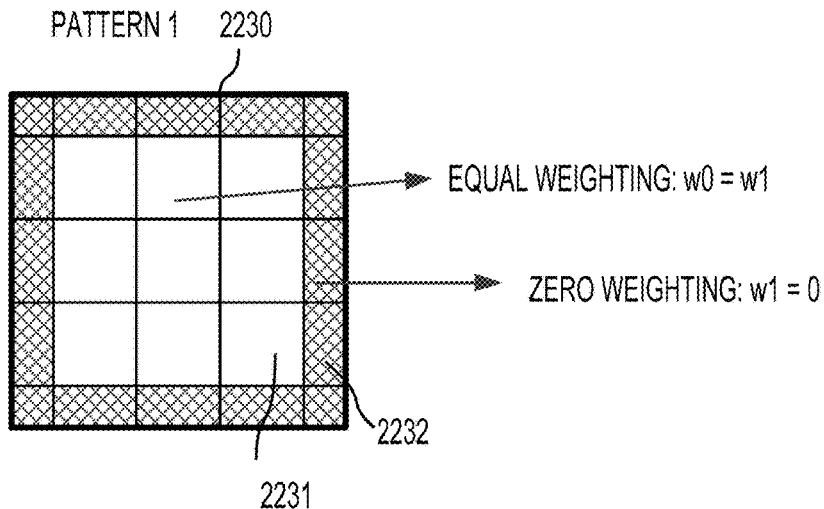
FIG. 25 shows a pattern for partitioning a current block in an interweaved affine prediction process.

In an embodiment, a range constraint operation is further applied to the averaged values from the precision conversion operation (2462). As a result, the final sample values in the final prediction (2470) are confined to be within a wage from 0 to a maximum possible sample value (e.g., (1<<input bitDepth)−1). For example, the constraint operation can be represented by:

$$\text{Clip}(0, (1 << \text{bitDepth}) - 1, \text{Pred}) \quad (5.4)$$

where clip ( ) denotes a clipping operation,

In an embodiment, as shown in FIG. 25 where the partitioning pattern (2230) is reproduced, the fractional sub-blocks (2232) (the shaded area) in the partitioning; pattern (2230) are not predicted (or in other words, no interweaved affine prediction is applied). For example, no interpolation is performed in the shaded area. The original samples in the shaded area may be stored into the prediction (2250). For the samples of the shaded area in the prediction (2250), a zero weight (w1=0) can be applied, and the expression (5.2) or (5.3) can be used similarly as for the other samples in the prediction (2250). In this way, a unified weighted average calculation process e.g., the weighted average operation (2461)) can be used for all pixels in the predictions (3240) and (2250).

In another embodiment, equal weighting (w0=w1) is employed to samples in the non-shaded area (corresponding to the whole sub-blocks 2231) in FIG. 25 for the weighted average operation (2461). In this way, the weighting pattern 2300 needs not to be stored, and the weighted average operation (2461) can be simplified.

3. Deblocking for Blocks Coded with Interweaved Affine Prediction

In an embodiment, deblocking is disabled for a block coded with interweaved affine prediction. For example, no deblocking is performed for samples within the block. Generally, a deblocking operation can be performed to an affine coded block to reduce discontinuities at edges of sub-blocks. However, interweaved affine prediction has a smoothing effect due to the weighted average operation. Thus, deblocking can be disabled to save the processing cost.

In another embodiment, deblocking is disabled for the non-shaded area, while still performed in the shaded area (as shown in FIG. 25). For example, in some embodiments, interweaved affine prediction is only applied in the non-shaded area, not in the shaded area. Thus, the shaded and non-shaded areas can be treated differently.

Figure 26:
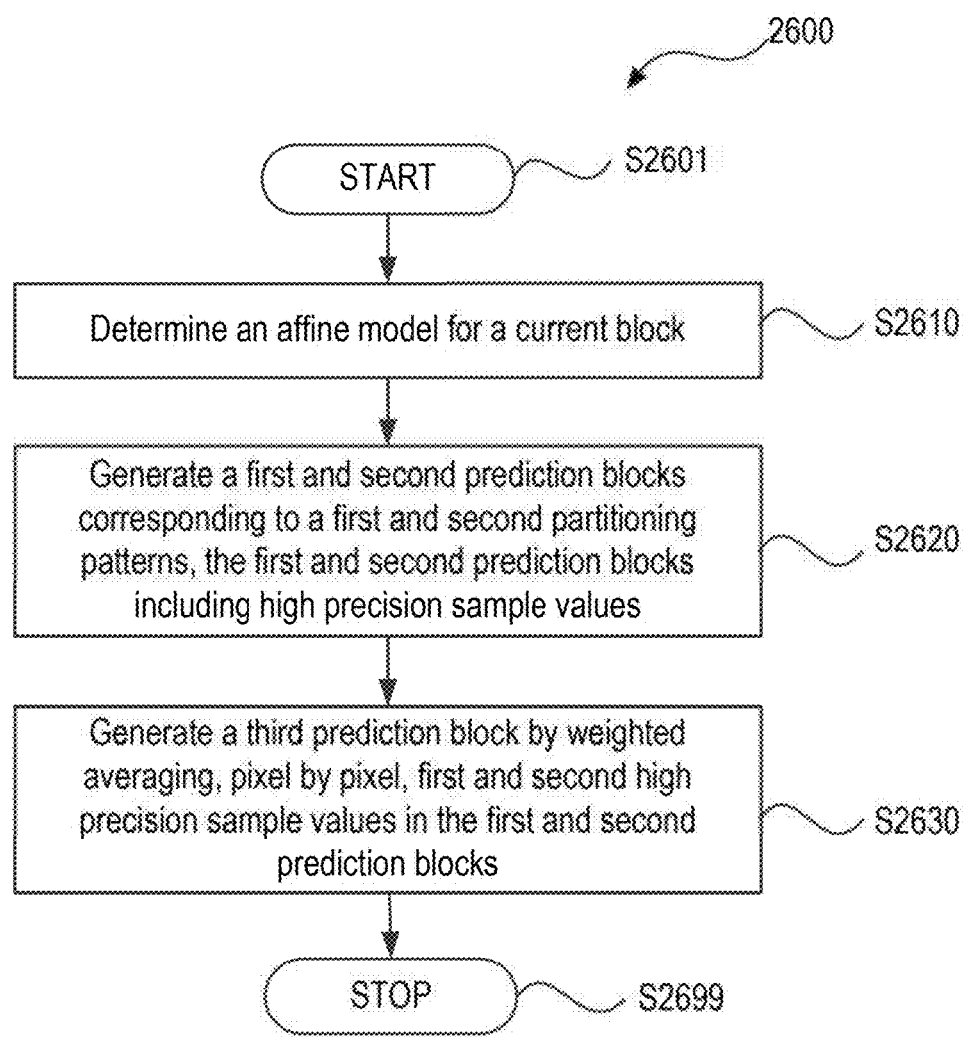
FIG. 26 shows a flow chart of an interweaved affine prediction process with a high precision in accordance with an embodiment.

4. Example of an Interweaved Offline Prediction Process with a High Precision FIG. 26 shows a flow chart outlining a process (2600) according to an embodiment of the disclosure. The process (2600) can be used in the reconstruction of a block coded in an interweaved affine prediction mode, so to generate a prediction block for the block under reconstruction. In various embodiments, the process (2600) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), and the like. In some embodiments, the process (2600) is implemented in software instructions, thus when the processing circuitry executes the software instructions, the processing circuitry performs the process (2600). The process starts at (S2601) and proceeds to (S2610).

At (S2610), an affine model can be determined for a current block that is coded with an interweaved affine prediction mode. For example, based on a merge index received in a bitstream, an affine merge candidate (e.g., a reconstructed or inherited affine candidate) may be selected from a sub-block based merge candidate list. The selected merge candidate may represent the affine model with three or two CPMVs, or affine model parameters.

At (32620), a first and second prediction blocks corresponding to a first and second partitioning pattern can be generated. For example, the current block can be partitioned into sub-blocks using the first and second partitioning pattern separately. MVs corresponding to the sub-blocks can be determined based on the affine model. Based on the sub-block MVs, AMC process may be performed to determine the first and second prediction blocks, During the AMC process, interpolated samples with an intermediate bit-depth (e.g., 16 bits) larger than an input depth (e.g., 10 bits) of the current block can be generated. The resulting first and second prediction blocks can include the interpolated samples which have a higher precision than that of the original samples in the current block.

At (S2630), a third (final) prediction block can be generated based on the first and second prediction blocks. For example, first samples in the first prediction block and corresponding second samples in the second prediction block each with the high precision corresponding to the intermediate bit-depth are combined by performing a weighted average operation to obtain averaged samples. The averaged samples are subsequently rounded to the input bit-depth to obtain corresponding third samples in the third prediction block. The process (2600) can proceed to (S2699), and terminates at (S2699).

VI Computer System

The techniques described above, can be implemented as computer software using computer-readable instructions and physically stored in one or more computer-readable media. For example, FIG. 27 shows a computer system (2700) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 27:
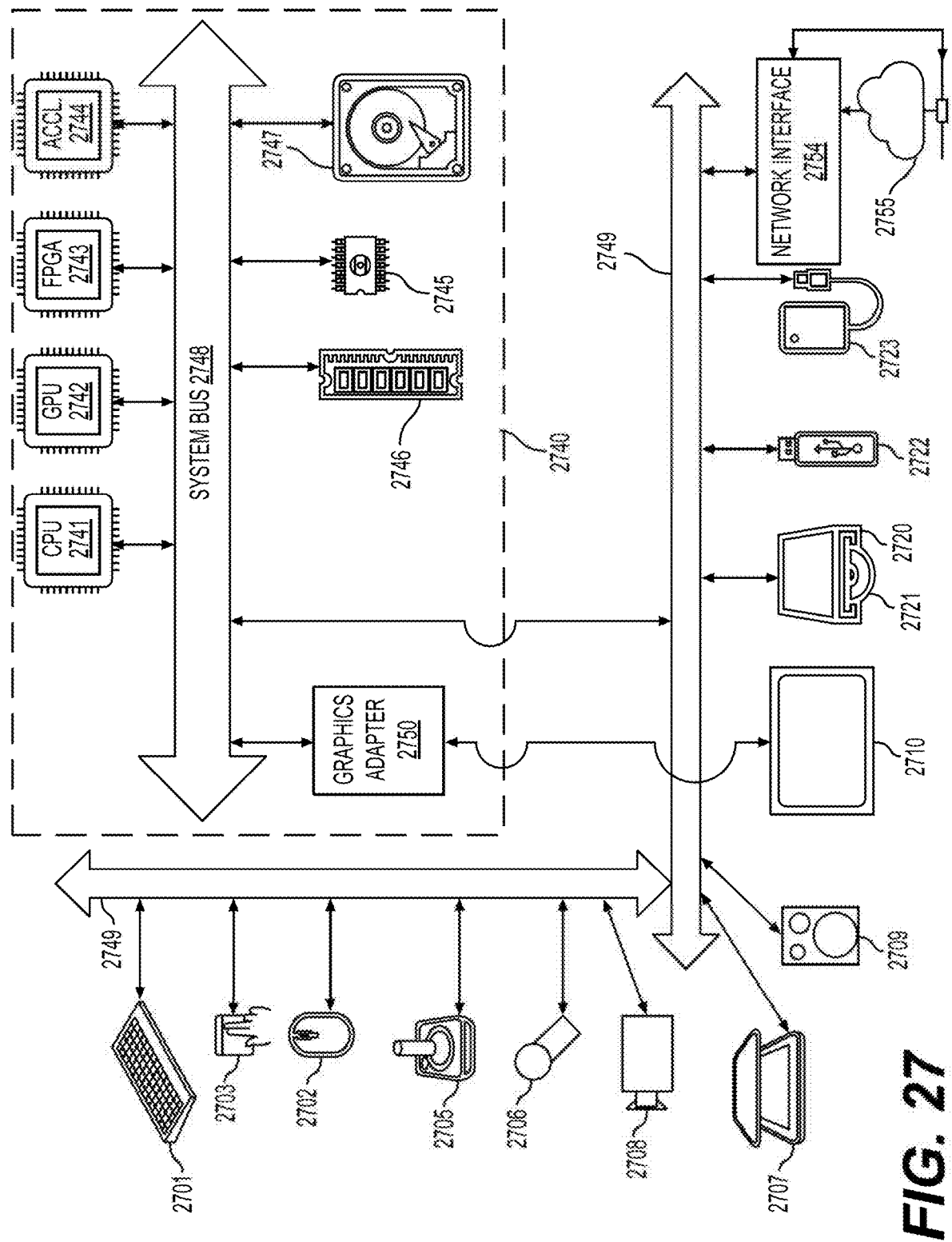
FIG. 27 is a schematic illustration of a computer system in accordance with an embodiment.

The components shown in FIG. 27 for computer system (2700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2700).

Computer system (2700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2701), mouse (2702), trackpad (2703), touch screen (2710), data-glove (not shown), joystick (2705), microphone (2706), scanner (2707), camera (2708).

Computer system (2700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2710), data-glove (not shown), or joystick (2705), but there can also be tactile feedback devices that do not serve as input devices), audio output devices (such as: speakers (2709), headphones (not depicted)), visual output devices (such as screens (2710) to include CRT screens, LCD screens, plasma screens, OLED screens, each with or without touch-screen input capability, each with or without tactile feedback capability some of which may be capable to output two dimensional visual output or more than three dimensional output through means such as stereographic output; virtual-reality glasses (not depicted), holographic displays and smoke tanks (not depicted)), and printers (not depicted).

Computer system (2700) can also include human accessible storage devices and their associated media such as optical media including CD/DVD ROM/RW (2720) with CD/DVD or the like media (2721), thumb-drive (2722), removable hard drive or solid state drive (2723), legacy magnetic media such as tape and floppy, disc (not depicted), specialized ROM/ASIC/PLD based devices such as security dangles (not depicted), and the like.

Those skilled in the art should also understand that term "computer readable media" as used in connection with the presently disclosed subject matter does not encompass transmission media, carrier waves, or other transitory signals.

Computer system (2700) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly requite external network interface adapters that attached to certain general purpose data ports or peripheral buses (2749) (such as, for example USB ports of the computer system (2700)); others are commonly integrated into the core of the computer system (2700) by attachment to a system bus as described below (for example Ethernet interface into a PC computer system or cellular network interface into a smartphone computer system). Using any of these networks, computer system (2700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2740) of the computer system (2700).

The core (2740) can include one or more Central Processing Units (CPU) (2741), Graphics Processing Units (GPU) (2742), specialized programmable processing units in the form of Field Programmable Gate Areas (FPGA) (2743), hardware accelerators for certain tasks (2744), and so forth. These devices, along with Read-only memory (ROM) (2745), Random-access memory (2746), internal mass storage such as internal non-user accessible hard drives, SSDs, and the like (2747), may be connected through a system bus (2748). In some computer systems, the system bus (2748) can be accessible in the form of one or more physical plugs to enable extensions by additional CPUs, GPU, and the like. The peripheral devices can be attached either directly to the core's system bus (2748), or through a peripheral bus (2749). Architectures for a peripheral bus include PCI, USB, and the like.

CPUs (2741), GPUs (2742), FPGAs (274), and accelerators (2744) can execute certain instructions that, in combination, can make up the aforementioned computer code. That computer code can be stored in ROM (2745) or RAM (2746). Transitional data can be also be stored in RAM (2746), whereas permanent data can be stored for example, in the internal mass storage (2747). Fast storage and retrieve to any of the memory devices can be enabled through the use of cache memory, that can be closely associated with one or more CPU (2741). GPU (2742), mass storage (2747), ROM (2745), RAM (2746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2700), and specifically the core (2740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2740) that are a non-transitory nature, such as core-internal mass storage (2747) or ROM (2745). The software implementing various embodiments of the present disclosure can be stored in such devices and executed by care (2740). A computer-readable medium can include one or more memory devices or chips, according to particular needs. The software can cause the core (2740 and specifically the processors therein (including CPU, GPU, FPGA, and the like) to execute particular processes or particular parts of particular processes described herein, including defining data structures stored in RAM 0746) and modifying such data structures according to the processes defined by the software. In addition or as an alternative, the computer system can provide functionality as a result of logic hardwired or otherwise embodied in a circuit (for example: accelerator (2744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

AMVP: Advanced MVP
ASIC: Application-Specific Integrated Circuit
BMS: benchmark set
CANBus: Controller Area Network Bus
CD: Compact Disc
CPUs: Central Processing Units
CRT: Cathode Ray Tube
CTBs: Coding Tree Blocks
CTUs: Coding Tree Units
CU: Coding Unit
DVD: Digital Video Disc
FPGA: Field Programmable Gate Areas
GOPs: Groups of Pictures
GPUs: Graphics Processing Units
GSM: Global System for Mobile communications
HEVC: High Efficiency Video Coding
HMVP: History-based MVP
HRD: Hypothetical Reference
IC: Integrated Circuit
JEM: joint exploration model
LAN: Local Area Network
LCD: Liquid-Crystal Display
LTE: Long-Term Evolution
MMVD: Merge with MVD
MV: Motion Vector
MVD: Motion vector difference
MVP: Motion vector predictor
OLED: Organic Light-Emitting Diode
PBs: Prediction Blocks
PCI: Peripheral Component Interconnect
PLD: Programmable Logic Device
PUs: Prediction Units
RAM: Random Access Memory
ROM: Read-Only Memory
SEI: Supplementary Enhancement Information
SNR: Signal Noise Ratio
SSD: solid-state drive
SbTMVP: Subblock-based TMVP
TUs: Transform Units
TMVP: Temporal MVP
USB: Universal Serial Bus
VTM: Versatile test model
VUI: Video Usability Information
VVC: versatile video coding While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video encoding at a video encoder, comprising:
   determining an affine model for a current block to be coded with an interweaved affine mode;
   generating, based on the affine model, a first prediction block corresponding to a first pattern for partitioning the current block into first sub-blocks and a second prediction block corresponding to a second pattern for partitioning the current block into second sub-blocks, wherein the first prediction block includes first samples and the second prediction block includes second samples, the second pattern is obtained by shifting the first pattern, and the second sub-blocks include whole sub-blocks and fractional sub-blocks;
   generating a third prediction block based on the first and second prediction blocks, wherein the first samples in the first prediction block and the corresponding second samples in the second prediction block are combined by performing a weighted average operation to obtain averaged samples, and the first samples and the corresponding second samples are predicted from a same reference picture; and
   when interweaved affine prediction is applied to a region corresponding to the whole sub-blocks of the second sub-blocks and not applied to a region corresponding to the fractional sub-blocks of the second sub-blocks, disabling deblocking for the region corresponding to the whole sub-blocks of the second blocks, and performing deblocking for the region corresponding to the fractional sub blocks of the second sub-blocks.

2. The method of claim 1, wherein the weighted average operation includes adding a rounding offset to a weighted sum of the first sample, and the corresponding second sample.

3. The method of claim 1, wherein
   when the first and second samples are located within the region corresponding to the fractional sub-blocks of the second sub-blocks, then the second samples are given a zero weight in the weighted average operation.

4. The method of claim 3, wherein when the first and second samples are located within the region corresponding to the whole sub-blocks of the second sub-blocks, then the first and second samples are given an equal weight in the weighted average operation.

5. The method of claim 1, wherein the third samples are each constrained to be within a range from 0 to a maximum possible value corresponding to an input bit-depth of the current block.

6. The method of claim 1, wherein when interweaved affine prediction is applied to the whole sub-blocks and the fractional sub-blocks of the second sub-blocks, deblocking is disabled for the current block.

7. The method of claim 1, wherein the first samples and the second samples have a precision of an intermediate, bit-depth larger than an input bit-depth of the current block, and the averaged samples are rounded to the input bit-depth to obtain corresponding third samples in the third prediction block.

8. An apparatus of video encoding, comprising circuitry configured to:
   determine an affine model for a current block to be coded with an interweaved affine mode;
   generate, based on the affine model, a first prediction block corresponding to a first pattern for partitioning the current block into first sub-blocks and a second prediction block corresponding to a second pattern for partitioning the current block into second sub-blocks, wherein the first prediction block includes first samples and the second prediction block includes second samples, the second pattern is obtained by shifting the first pattern, and the second sub-blocks include whole sub-blocks and fractional sub-blocks;

generate a third prediction block based on the first and second prediction blocks, wherein the first samples in the first prediction block and the corresponding second samples in the second prediction block are combined by performing a weighted average operation to obtain averaged samples, and the first samples and the corresponding; second samples are predicted from a same reference picture; and when interweaved affine prediction is applied to a region corresponding to the whole sub-blocks of the second sub-blocks and not applied to a region corresponding to the fractional sub-blocks of the second sub-blocks, disable deblocking for the region corresponding to the whole sub-blocks of the second blocks, and perform deblocking for the region corresponding to the fractional sub-blocks of the second sub-blocks.

9. The apparatus of claim 8, wherein the weighted average operation includes adding a rounding offset to a weighted sum of the first sample and the corresponding second sample.

10. The apparatus of claim 8, wherein
when the first and second samples are located within the region corresponding to the fractional sub-blocks of the second sub-blocks, then the second samples are given a zero weight in the weighted average operation.

11. The apparatus of claim 10, wherein when the first and second samples are located within the region corresponding: to the whole sub-blocks of the second sub-blocks, then the first and second samples are given an equal weight in the weighted average operation.

12. The apparatus of claim 8, wherein the third samples are each constrained to be within a range from 0 to a maximum possible value corresponding to an input bit-depth of the current block.

13. The apparatus of claim 8, wherein when interweaved affine prediction is applied to the whole sub-blocks and the fractional sub-blocks of the second sub-blocks, deblocking is disabled for the current block.

14. The apparatus of claim 8, wherein the first samples and the second samples have a precision of an intermediate bit-depth larger than an input bit-depth of the current block, and the averaged samples are rounded to the input bit-depth to obtain corresponding third samples in the third prediction block.

15. A non-transitory computer-readable medium storing instructions that, when executed by a computer for video decoding, cause the computer to perform a method of video encoding, the method comprising:

determining an affine model for a current block to be coded with an interweaved affine mode;

generating, based on the affine model, a first prediction block corresponding to a first pattern for partitioning the current block into first sub-blocks and a second prediction block corresponding to a second pattern for partitioning the current block into second sub-blocks, wherein the first prediction block includes first samples and the second prediction block includes second samples, the second pattern is obtained by shifting the first pattern, and the second sub-blocks include whole sub-blocks and fractional sub-blocks;

generating a third prediction block based on the first and second prediction blocks, wherein the first samples in the first prediction block and the corresponding second samples in the second prediction block are combined by performing a weighted average operation to obtain averaged samples, and the first samples and the corresponding second samples are predicted from a same reference picture; and when interweaved affine prediction is applied to a region corresponding to the whole sub-blocks of the second sub-blocks and not applied to a region corresponding to the fractional sub-blocks of the second sub-blocks, disabling deblocking for the region corresponding to the whole sub-blocks of the second blocks, and performing deblocking for the region corresponding to the fractional sub-blocks of the second sub-blocks.

16. The non-transitory computer-readable medium of claim 15, wherein
when the first and second samples are located within the region corresponding to the fractional sub-blocks of the second sub-blocks then the second samples are given a zero weight in the weighted average operation.

17. The non-transitory computer-readable medium of claim 16, wherein when the first and second samples are located within the region corresponding to the whole sub-blocks of the second sub-blocks, then the first and second samples are given an equal weight in the weighted average operation.

18. The non-transitory computer-readable medium of claim 15, wherein the third samples are each constrained to be within a range from 0 to a maximum possible value corresponding to, an input bit-depth of the current block.

19. The non-transitory computer-readable medium of claim 15, wherein when interweaved affine prediction is applied to the whole sub-blocks and the fractional sub-blocks of the second sub-blocks, deblocking, is disabled for the current block.

20. The non-transitory computer-readable medium of claim 15, wherein the first samples and the second samples have a precision of an intermediate bit-depth larger than an input bit-depth of the current block, and the averaged samples are rounded to the input bit-depth to obtain corresponding third samples in the third prediction block.

* * * * *